US009819525B2

(12) United States Patent
Le Taillandier De Gabory et al.

(10) Patent No.: US 9,819,525 B2
(45) Date of Patent: Nov. 14, 2017

(54) SIGNAL GENERATING APPARATUS AND SIGNAL GENERATING METHOD

(71) Applicant: NEC Corporation, Minato-ku, Tokyo (JP)

(72) Inventors: Emmanuel Le Taillandier De Gabory, Tokyo (JP); Daisaku Ogasahara, Tokyo (JP); Shinsuke Fujisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/906,632

(22) PCT Filed: Jul. 31, 2013

(86) PCT No.: PCT/JP2013/004641
§ 371 (c)(1),
(2) Date: Jan. 21, 2016

(87) PCT Pub. No.: WO2015/015533
PCT Pub. Date: Feb. 5, 2015

(65) Prior Publication Data
US 2016/0173304 A1 Jun. 16, 2016

(51) Int. Cl.
H04L 25/06 (2006.01)
H04L 27/20 (2006.01)
(Continued)

(52) U.S. Cl.
CPC ..... *H04L 27/2096* (2013.01); *H04B 10/5057* (2013.01); *H04B 10/50575* (2013.01);
(Continued)

(58) Field of Classification Search
USPC .......................................................... 398/76
See application file for complete search history.

(56) References Cited

U.S. PATENT DOCUMENTS

2006/0127102 A1* 6/2006 Roberts ................ H04B 10/505
398/182
2011/0012519 A1* 1/2011 Zhao ..................... H03M 1/1235
315/185 R
(Continued)

FOREIGN PATENT DOCUMENTS

EP 2 584 718 A1 4/2013
JP 2008-249848 A 10/2008
(Continued)

OTHER PUBLICATIONS

International Search Report for PCT Application No. PCT/JP2013/004641, dated May 28, 2014.
(Continued)

Primary Examiner — David Payne
Assistant Examiner — Omar S Ismail

(57) ABSTRACT

To provide signal generating apparatus that is capable of controlling the DC bias of the optical modulator applicable to various kinds of modulation format, a signal processing apparatus includes a digital processing unit for deserializing an input digital data into parallel data lanes, for comparing the value of the digital data of symbol rate F to at least one predetermined threshold value, for selecting an offset value based on the result of the comparison; and for adding the selected offset value to the digital data, a converting unit for converting the digital data added the offset value to analog signals in each lane; an optical modulating unit for modulating a lightwave according to the analog signals with predetermined modulation format at the symbol rate F, where the modulated signal contains a frequency component at F/N.

20 Claims, 18 Drawing Sheets

(51) Int. Cl.
    *H04B 10/50*  (2013.01)
    *H04B 10/556*  (2013.01)
(52) U.S. Cl.
    CPC ... *H04B 10/50595* (2013.01); *H04B 10/5561* (2013.01); *H04L 25/06* (2013.01)

(56) References Cited

U.S. PATENT DOCUMENTS

| | | | | |
|---|---|---|---|---|
| 2011/0129230 | A1* | 6/2011 | Zanoni | H04B 10/5055 398/140 |
| 2012/0008723 | A1* | 1/2012 | Stojanovic | H03L 7/091 375/355 |
| 2012/0288284 | A1 | 11/2012 | Yoshida et al. | |

FOREIGN PATENT DOCUMENTS

| | | |
|---|---|---|
| JP | 2011-044906 A | 3/2011 |
| JP | 2012-128165 A | 7/2012 |
| JP | 2012-217127 A | 11/2012 |
| WO | 2009/036390 A1 | 3/2009 |
| WO | 2012/144082 A1 | 10/2012 |

OTHER PUBLICATIONS

Written opinion for PCT Application No. PCT/JP2013/004641.

Fujisawa et al., "Demonstration of the Mitigation of Intra-channel Nonlinearities based on Inter-Polarization Digital Frequency Off-setting with 50Gb/s PM-QPSK Signal over 10,080km Transmission", European Conference and Exhibition on Optical Communication (ECOC) 2012, Mo.1.C.2, Sep. 2012. Abstract only. Cited in the Specification.

T. Yoshida et al., "A Study on Automatic Bias Control for Arbitrary Optical Signal Generation by Dual-parallel Mach-Zehnder Modulator", ECOC 2010, Tu.3.A.6, Sep. 2010. Abstract only. Cited in the Specification.

* cited by examiner

SIGNAL GENERATING APPARATUS AND SIGNAL GENERATING METHOD

This application is a National Stage Entry of PCT/JP2013/004641 filed on Jul. 31, 2013, the contents of all of which are incorporated herein by reference, in their entirety.

TECHNICAL FIELD

The present invention relates generally to signal generating apparatus and signal generating method, and more particularly, to signal generating apparatus and signal generating method for optical transmitter with modulators.

BACKGROUND ART

Digital Signal Processing (DSP) techniques enable to compensate impairments affecting optical signal during transmission over optical fiber by applying inverse filter properties of the impairments. These techniques enable the transmission of higher rate channels on longer reach and can be applied at the receiver receiving an optical signal through a medium, such as optical fiber. Notably, coherent reception technique enables to get the information on both phase and amplitude of the received signal. In this way, the DSP compensates for impairments caused during transmission, before reception, by applying appropriately calculated filters.

The benefits of digital signal processing are not limited to the application of this technique to the receiver end. Comparably, DSP techniques combined with Digital to Analog Converter (DAC) can be applied at the transmitter side. In such a case, the transmitter, hereafter called digital transmitter, including a DSP processor and a DAC to convert digital signal to analog signals are used to drive an optical modulator.

The DSP in a digital transmitter can be also used to mitigate at the transmitter side nonlinear impairments appearing in the transmission inside of the optical fiber, as illustrated by NPL (non-patent literature) 1. Such DSP technique for processing signals at the digital transmitter in order to compensate or mitigate impairments appearing during transmission is called pre-compensation or pre-distortion depending on sources.

Modulation in a digital transmitter can be performed with an optical IQ (In phase/Quadrature phase) modulator, sometimes called Cartesian modulator, vector modulator, dual parallel modulator or nested modulator depending on the sources. In an IQ modulator, electric signals drive two independent Mach-Zehnder devices which are called children Mach-Zehnder Modulators (MZM), and which modulate the phase and the amplitude of the same optical carrier and whose outputs are relatively phase delayed by 90 degrees before being recombined. These components are called Inphase (I) and Quadrature phase (Q) of the signal. The phase difference between the outputs of the children MZM can be called the angle of quadrature and is ideally 90 degrees. Such IQ modulators are also widely used in optical transmitters.

Additionally, relevant to the present application, PTL (patent literature) 1, PTL2, PTL3, PTL4 and NLP2 disclose bias control circuits for MZMs.

CITATION LIST

Patent Literature

[PTL1] Japanese Patent Application Laid-Open Publication No. JP 2012-217127
[PTL2] Japanese Patent Application Laid-Open Publication No. JP 2012-128165
[PTL3] Japanese Patent Application Laid-Open Publication No. JP 2011-044906
[PTL4] Japanese Patent Application Laid-Open Publication No. JP2008-249848

[Non Patent Literature]

[NPL1] S. Fujisawa et al., "Demonstration of the Mitigation of Intra-channel Nonlinearities based on Inter-Polarization Digital Frequency Offsetting with 50 Gb/s PM-QPSK Signal over 10,080 km Transmission", European Conference and Exhibition on Optical Communication (ECOC) 2012, Mo.1.C.2, Septemmber, 2012.
[NPL2] T. Yoshida et al., "A Study on Automatic Bias Control for Arbitrary Optical Signal Generation by Dual-parallel Mach-Zehnder Modulator", ECOC 2010, Tu.3.A.6, September, 2010.

SUMMARY OF INVENTION

Technical Problem

First, the control of a transmitter according to background art is explained in order to clarify problems with the related art.

One known issue with IQ modulators is change of DC bias due to variation of the temperature or to ageing of the device. The affected biases are of three types, the DC biases of each of the two children MZM, the I and the Q children MZM and the DC bias used to set control the angle of quadrature. The drifts in the biases result in incorrect setting of the modulator, which causes a degradation of the transmitted signal, and therefore a degradation of the received signal quality. This issue is susceptible to appear between the characterization of the modulator on production site of the modulator or on the assembly site of the transmitter which uses the IQ modulators and the time the IQ modulators are first used for modulation of data. The time of the modulator is first used for modulation of data is called startup. The same issue is also susceptible to occur during the operation of the modulator.

This issue is already known with transmitters which do not implement DSP, such as known QPSK transmitters, and the issue is solved with by using automatic bias control (ABC) circuits which controls the biases of the modulators and the compensation for the DC bias change. In this manner, the ABC circuit compensates for both the bias drift at startup and during operation.

FIG. 17 is a schematic representation of an optical transmitter 100 related to the present application. The optical transmitter 100 includes an IQ modulator 111 and an Auto Bias Control (ABC) circuit 130 controlling the DC biases of the IQ modulator 111.

The transmitter 100 emits a lightwave signal 102 modulated by the modulator 111 according to input data stream 101. The input data stream is a logical binary data stream. A serializer/deserializer (SER/DES) unit 120 transforms the binary data stream 101 into parallel lanes of binary data into the coding unit 121. The coding unit 121 may include a Forward Error Correction (FEC) coding part. The data coded by the coding unit 121 is fed into the DSP/DAC unit 122 which can perform digital signal processing and digital to analog conversion. The data, which are output by the DSP/DAC unit 122, are amplified by the driver amplifiers (Amp)

116 and 117 so that their output voltage is suitable to drive the RF inputs of the IQ modulator 111.

A continuous wave signal is emitted by a laser 110 and is fed into the input of the IQ modulator 111. The I child Mach-Zehnder Modulator (MZM) 112 of the IQ modulator 111 is driven by the output of the driver (Amp) 116. The Q child MZM 113 of the IQ modulator 111 is driven by the output of the driver (Amp) 117. The phase adjuster (φIQ)114 controls the angle of quadrature of the IQ modulator 111. A low speed monitor photo diode (PD) 115 is integrated in the IQ modulator 111 and provides a monitoring electrical signal proportional to the output of the IQ modulator 111. Alternatively, PD 115 can be provided outside the IQ modulator 111 and generate a monitor electrical signal from a tapped portion of the lightwave signal emitted by the IQ modulator 111.

The monitor signal generated by the monitor PD 115 is provided to the ABC circuit 130, controlling the three DC biases of the IQ modulator 111. The ABC circuit 130 includes three control circuits 131 (I control & Dither), 132 (Q control & Dither) and 133 (φIQ control & Dither), to control respectively the DC biases of the I child MZM 112, the DC bias of the Q child MZM 113 and the DC bias of phase adjuster 114. The ABC circuit 130 optimizes the DC biases of the IQ modulator 111 according to the monitor signal generated by the PD 115.

The ABC circuit 130 uses low frequency dither tones overlapped on the DC biases of the IQ modulator 111 by the control units 131, 132 and 133. The phase and the amplitudes of the frequency components corresponding to the tone frequencies are extracted from the monitor signal generated by the monitor PD 115. The control units 131, 132 and 133 control the respective DC biases according to the amplitude and the phase of the extracted frequencies from the monitor signal. Alternatively, tone dithers can be added to the respective outputs of the driver 116 and 117 rather than on the DC biases. The result on the children MZM 112 and 113 is identical in either case. Therefore, either configuration can be used with the same effects. The basic structure for controlling the DC biases of the optical modulator by adding dither tone is also shown in PTL1, PTL2, PTL3, PTL4 and NLP2.

As shown in PTL4, the correct biases for optimal modulation are Vpi for each of the children MZM. Vpi corresponds to the null point or point of minimum transmission of the children MZM. According to the periodicity of the electrical characteristics of the children MZM, biases have a periodicity of 2 Vpi. The optimal DC bias for the angle of quadrature corresponds to the bias which generates an angle of 90 degrees phase shift. According to the periodicity of the characteristics of the IQ modulator 111, the periodicity of the angle of quadrature is 360 degrees.

FIG. 18 is a summary of simulation results of the monitor signals used by the ABC circuits of FIG. 17. In this case, the transmitter 100 of FIG. 17 transmits 32G (giga) baud QPSK (quadrature phase shift keying) signal. The QPSK signal is single polarization signal. But using a dual polarization (DP-) IQ modulator instead of the single polarization IQ modulator 111 enables to generate polarization multiplexed (PM-) QPSK signal while the same ABC circuits 130 on each polarization are used. The dither frequency used for the tone is chosen as 7.8 MHz.

The curves 211 to 217 of FIG. 18 represents the amplitude of the monitor signal at the frequency of the dither tone extracted from the output of the PD 115, for different values of the output amplitudes of the drivers (Amps) 116 and 117; the amplitude of the monitor signal is multiplied by the phase of the monitor signal, while the original dither tone is taken as a reference for null phase. The error signal used by the control units 131 and 132 is equal to the monitor signals plotted on the curves 211 to 217 multiplied by the dither tone value, which is added to the DC bias. In this manner, the control units work in a zero cross manner.

Now, we consider the case of the curve 211, which corresponds to the case of the amplitude of the output of the drivers 116 and 117 (Vdriver) is equal to 2 Vpi. This is the optimal amplitude for high signal quality of the transmitter 100. The optimal value for the DC bias is the point 202, which corresponds to the case of a bias of Vpi.

Between the points 201 and 202, the extracted monitor value and the dither tone value on the DC bias are in phase. Therefore, the error signal generated by multiplying the dither tone value and the monitor value is positive and the monitor value leads to increasing the DC bias.

Between the points 202 and 203, the extracted monitor value and the dither tone value on the DC bias are in opposite phase. Therefore, the error signal generated by multiplying the dither tone value and the monitor value is negative, which leads to decreasing the DC bias. This leads to the optimal zero cross condition therefore the feedback converges to the point 202 of a stable voltage of Vpi. It should be noted that the points 201 and 203 represent the same condition with the periodicity of 2 Vpi and lead to null monitor signal. However, due to the opposite phase information, these points are unstable; therefore the feedback circuit only locks and tracks the optimal DC bias of Vpi. In the case of the curves 212 and 213, where the output of the drivers 116 and 117 are respectively equal to 1.5 Vpi and 1.25 Vpi, the feedback control of the ABC circuit 130 works in the same manner as for the curve 211. Therefore the ABC circuit controls optimally the DC biases of the IQ modulator 111.

In the case of the curve 214, the amplitude of the drivers 116 and 117 is equal to Vpi. In this case, the monitor signal is null for all biases voltage. This means that the ABC circuit 130 cannot control correctly the DC biases of the IQ modulator.

Moreover, in the case of the curves 215 to 217, the monitor signal and the dither tone are in opposite phase between the points 201 to 202 and inphase between the points 202 to 203. This means that the error signal will be negative when the DC bias is less than Vpi and positive when the DC bias is greater than Vpi. Therefore, the point 202 is no longer stable and the ABC circuit 130 will lock the DC biases of the modulator 111 to 0 or 2 Vpi, which are the same condition, according to the periodicity. In that case, the ABC circuit 130 controls the DC biases of the modulator 111 but the signal 102 emitted by the transmitter 100 cannot be received and decoded properly because the DC biases are incorrect.

In the case of QPSK signal, the output of the drivers 116 and 117 can take only two values. When their amplitude is greater than Vpi, the ABC circuit 130 uses a monitor signal of the expected polarity and the monitor signal locks the DC biases of the IQ modulator 111 to the optimal conditions.

However, when the amplitude of the driver 116 or 117 is less than Vpi, the ABC circuit 130 uses a monitor signal of the opposite polarity of the expected signal and the ABC circuit 130 locks the DC biases of the IQ modulator 111 to wrong conditions. Additionally, when the amplitude of the drivers 116 and 117 is Vpi, the ABC circuit 130 cannot get any monitor signal and is unable to control the DC biases of the modulator 111.

Now considering more complex modulation formats and driving signals generated with pre-compensation with proper configuration of the DSP/DAC unit 122, the output of the drivers 116 and 117 will take more than 2 values. However, considering the difference in order between the tone frequency and the signal baud rate, the resulting monitor signal can be thought of the signal obtained by superposition of monitors for QPSK. That is, relative weight among the output signals of the drivers 116 and 117 is determined by the probability of the corresponding QPSK amplitude in the amplitude distribution of the complex driving signal.

NPL2 describes that for a PAPR (peak to average power ratio) of the driving signal greater than 0.5, the decomposition will lead to dominant QPSK with amplitude greater than Vpi, and therefore the resulting monitor signal will have an expected polarity. In this case, background art such as PTL1 and NPL2 can control efficiently the modulator 111.

In the case where the PAPR of the driving signal less than 0.5, the decomposition will lead to dominant QPSK with amplitude less than Vpi, and therefore the resulting monitor signal will have a polarity opposite to the expected one. This means that the structure of PTL1 cannot be used for such conditions.

The structure of NPL2 can be used in such conditions, as the condition on PAPR lower than 0.5 will invert the zero cross phase comparison as explained. However, this comes with the constraint of additional resource for additional feedback, feedback switching and monitoring of PAPR.

Furthermore, the ABC technique in NPL2 exhibits very poor sensitivity for electrical driving signals with PAPR of the driving signal near or equal to 50%. Therefore the ABC technique in NPL2 is not able to control with high precision the DC biases of the IQ modulator 111 of a digital transmitter 100 configured to emit signal using pre-distortions method such as inter-polarization frequency offset, described in NPL1, as the resulting PAPR is equal to 50%. The same insufficient precision appears also for high index QAM (quadrature amplitude modulation), such as 64QAM or above as the PAPR is near to 50%.

The structures described in PTL2, PTL3 and PTL4 also do not show the solution to the problem that the monitor signal will have a polarity opposite to the expected one and that the ABC circuit cannot control the DC biases of the IQ modulator with high precision when the phase modulation is performed in high order format.

The object of the invention is to provide signal generating apparatus and signal generating method that is capable of controlling the DC bias of the optical modulator applicable to various kinds of modulation format.

Solution to Problem

The signal generating apparatus of the present invention includes digital processing means for deserializing an input digital data into parallel data lanes; for comparing the value of the digital data of symbol rate F, where F is a real number, to at least one predetermined threshold value; for selecting an offset value, based on the result of the comparison; and for adding the selected offset value to the digital data, converting means for converting the digital data added the offset value to analog signals in each data lane; optical modulating means for modulating a lightwave according to the analog signals with predetermined modulation format at the symbol rate F, where the modulated signal contains a frequency component at F/N and N is an integer strictly greater than 1, wherein the offset value is selected among a set of selectable offset values, which are updated with a temporal periodicity of N/F.

The signal generating method of the present invention includes deserializing an input digital data into parallel data lanes, comparing the value of the digital data of symbol rate F, where F is a real number, to at least one predetermined threshold value; selecting an offset value to the digital data; converting the digital data added the offset value to analog signals in each data lane; and modulating a lightwave according to the analog signals with predetermined modulation format at the symbol rate F; where the modulated signal contains a frequency component at F/N and N is an integer strictly greater than 1, wherein the offset value is selected among a set of selectable offset values, which are updated with a temporal periodicity of N/F.

The non-transitory computer-readable recording medium of the present invention records the program causing a computer to execute a process including: deserializing an input digital data into parallel data lanes, comparing the value of the digital data of symbol rate F, where F is a real number, to at least one predetermined threshold value; selecting an offset value based on the result of the comparison; adding the selected offset value to the digital data; converting the digital data added the offset value to analog signals in each data lanes; and modulating a lightwave according to the analog signal with predetermined modulation format at the symbol rate F, where the modulated signal contains a frequency component at F/N and N is an integer strictly greater than 1; wherein the offset value is selected among a set of selectable offset values, which are updated with a temporal periodicity of N/F.

Advantageous Effects of Invention

The signal generating apparatus and the signal generating method bring the effect that makes controlling the DC bias of the optical modulator applicable to various kinds of modulation format.

DESCRIPTION OF EMBODIMENTS (First exemplary embodiment)

Figure 1:
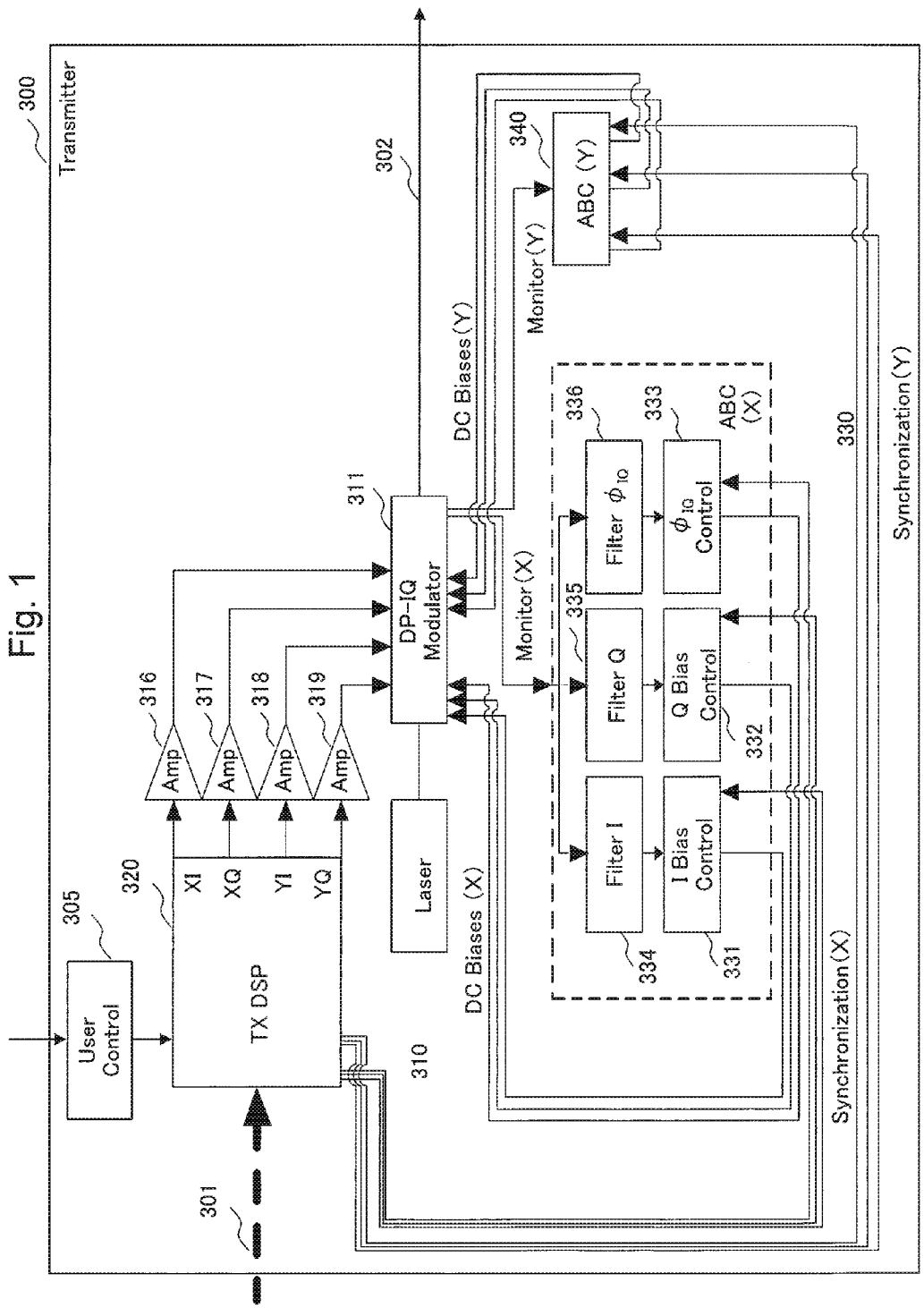
FIG. 1 A schematic representation of a digital transmitter according to the first exemplary embodiment.

FIG. 1 is a schematic representation of a transmitter 300 according to the first exemplary embodiment of the present invention. The transmitter 300 generates a lightwave signal 302 which is modulated according to the input data stream 301. The input data stream 301 represents a logical stream and may include several lower bit rate in parallel tributaries.

The transmitter 300 contains a user control unit 305 which controls functions according to a control signal provided remotely. The transmitter 300 includes a DP-IQ modulator 311, which modulates light carrier emitted by the laser 310. The DP-IQ modulator 311 includes polarization maintaining coupling section to divide the input lightwave while maintaining the polarization of the lightwave. The DP-IQ modulator 311 further includes two IQ modulators similar to the IQ modulator 111 of FIG. 17. The divided part of the lightwave signal is modulated by each of the IQ modulator in every polarization (X polarization and Y polarization). The outputs of two IQ modulators are combined in an orthogonal manner in order to generate polarization multiplexed signal, using X polarization and orthogonal Y polarization.

Figure 17:
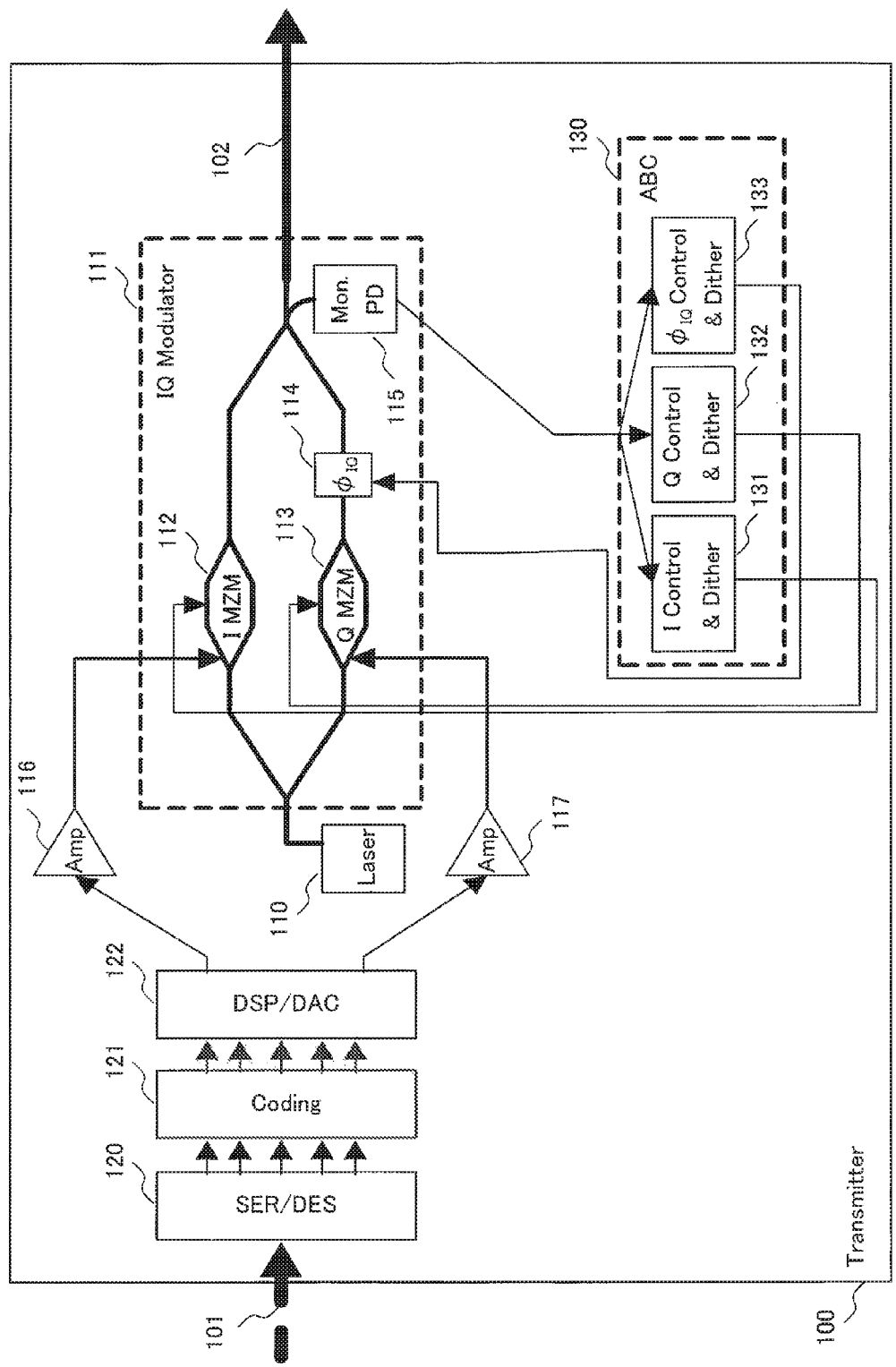
FIG. 17 A schematic representation of an optical transmitter 100 related to the present application.

The DP-IQ modulator 311 has therefore two integrated monitor PDs similar to monitor PD 115 of FIG. 17, one PD is for X polarization and another PD is for Y polarization. The DP-IQ modulator 311 has four high speed data inputs for the driving signals XI (X polarization and Inphase), XQ (X polarization and Quadrature), YI (Y polarization and Inphase) and YQ (Y polarization and Quadrature). The driving signals XI, XQ, YI and YQ are output from TX DSP 320, are amplified by the drivers (Amp) 316 to 319, respectively and are fed in the DP-IQ modulator 311 to modulate the light carrier.

Six DC biases are inputted to the DP-IQ modulator 311; the three biases are used for the X polarization, namely for the XI child MZM bias, the XQ child MZM and the X angle of quadrature. The remaining three biases are used for the Y polarization, namely for the YI child MZM bias, the YQ child MZM and the Y angle of quadrature.

The input data stream 301 is fed in the transmitter DSP (TX DSP) 320. The transmitter DSP 320 includes serializer/deserializer (SER/DES) functions, multiplexing functions, coding functions, signal processing functions and dedicated signal processing functions. The transmitter DSP 320 includes four DACs which generates four data lanes XI, XQ, YQ and YQ to drive the DP-IQ modulator 311. Alternatively, the transmitter DSP 320 may be integrated inside a transponder DSP including functions of digitalization, signal processing and demodulation to receive a signal. The four high speed analog signals output by the transmitter DSP 320 are fed respectively to four drivers noted 316, 317, 318 and 319. The drivers 316 to 319 amplify the output of the transmitter DSP 320 so that the amplitudes of the outputs of the drivers are suitable for the DP-IQ modulator 311. The outputs of the four drivers are connected to the four high speed inputs of the DP-IQ modulator 311.

The ABC circuit 330 controls the three DC biases for the X polarization of the DP-IQ modulator 311 according to the output of the monitor PD (Monitor (X)) dedicated to the X polarization of the DP-IQ modulator 311. The output of the monitor PD is split into three identical monitor signals which are respectively fed to the filtering units 334, 335 and 336.

The filtering units 334 to 336 extract a component at a frequency imprinted by processing in the transmitter DSP 320. The I bias control unit 331 controls the XI DC bias of the DP-IQ modulator 311 in order to minimize an error signal generated from the output of the filter 334 and a synchronization signal (Synchronization (X)) generated by the transmitter DSP 320. The control unit 332 controls the XQ DC bias of the DP-IQ modulator 311 in order to minimize an error signal generated from the output of the filter 335 and the synchronization signal. The phase control unit ($\phi$IQ control) 333 controls the DC bias corresponding to the angle of quadrature of the DPIQ modulator 311 in order to minimize an error signal generated from the output of the filter 336 and the synchronization signal.

The ABC circuit 330 can be realized with analog circuits and analog filters. Alternatively, the ABC circuit 330 can be realized with a digital control circuits and digital filters. In this case, the ABC circuit 330 may be integrated into the DSP 320.

The structure of the ABC circuit 340 is identical to the ABC circuit 330. Namely, the ABC circuit 340 also includes three filtering units and three control units corresponding to the filtering units 334 to 336 and the control units 331 to 333. The ABC circuit 340 controls the three DC biases for the Y polarization of the DP-IQ modulator 311 according to the output of the monitor PD (Monitor (Y)) dedicated to the Y polarization. The ABC circuits 330 and 340 can be integrated into a single unit which controls the six DC biases of the DP-IQ modulator 311 according to two monitor PDs.

Figure 2:
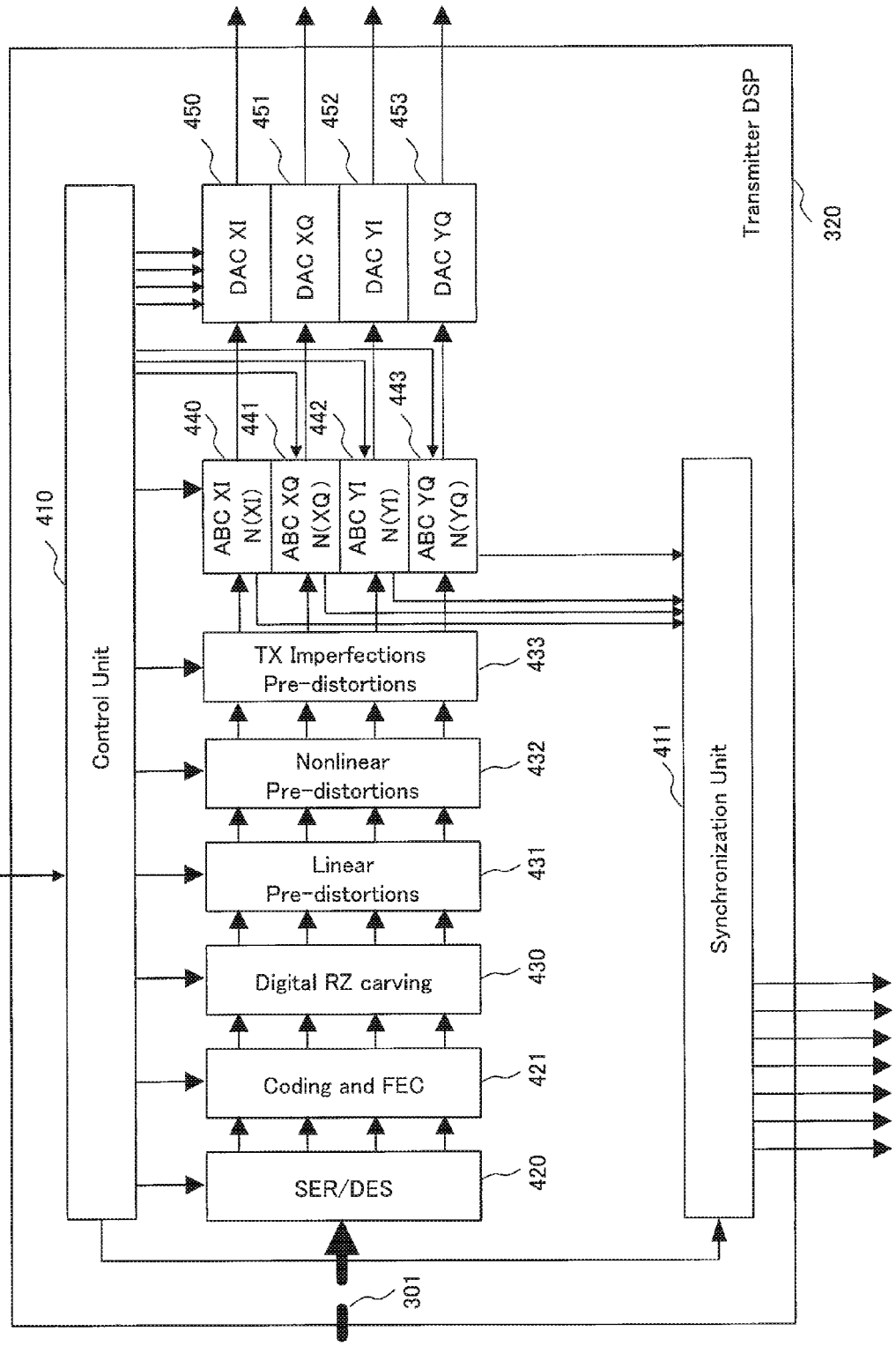
FIG. 2 A schematic representation of a transmitter DSP shown in FIG. 1.

FIG. 2 is a schematic representation of a transmitter DSP 320 of represented in FIG. 1. The transmitter DSP 320 is provided with an input data stream 301 which can be implemented as parallel lower bit rate tributaries. The transmitter DSP 320 outputs four analogs signals, through the four DACs, DAC XI 450, DAC XQ 451, DAC YI 452 and DAC YQ 453, that can be used to drive a modulator of a digital transmitter 300.

The input data stream 301 is a logical bit stream and is transformed into lower rate parallel tributaries with a serializer/deserializer (SER/DES) 420.

A coding and FEC unit 421 codes the bit lanes for gray coding, differential encoding and FEC (forward error correction) encoding. A digital RZ carving unit 430 performs RZ (return to zero) pulse carving shaping as well as spectral shaping on the digital data.

A linear pre-distortion unit 431 performs pre-compensation of linear impairments. The linear pre-distortion unit 431 can pre-compensate an amount of CD (chromatic dispersion) in frequency domain. A nonlinear pre-distortion unit 432 performs signal processing in order to mitigate nonlinear distortions. The nonlinear pre-distortion unit 432 can perform inter-polarization digital frequency offsetting.

A TX imperfections pre-distortions unit 433 compensates distortions due to the transmitter front end, including impairments due to bandwidth limitation of the DAC of the drivers of the transmitter and of the modulator, as well degradation of the linearity due to the driver and modulator properties, as well as aperture effect.

According to the first exemplary embodiment, the transmitter DSP 320 provides digital ABC units, ABC XI 440, ABC XQ 441, ABC YI 442 and ABC YQ 443 in FIG. 2.

The digital ABC unit 440 processes the digital signal coming from preceding units of the transmitter DSP 320. The digital signal is destined to the DAC of the tributary XI (DAC XI 450). The digital ABC unit 440 is characterized with the integer N(XI). The integer N(XI) relates to the periodicity of the process of the digital ABC unit 440.

Similarly, the respective digital ABC units 441, 442 and 443 process the digital signal coming from preceding units of the transmitter DSP 320. The digital signals are destined to the DACs of the respective channels XQ (DAC XQ 451), YI (DAC YI 452) and YQ (DAC YQ 453). The DACs 451 to 453 are characterized by the respective integers N(XQ), N(YI) and N(YQ). The integer N(XQ), N(YI) and N(YQ) relate to the periodicity of the process of the digital ABC unit 441, 442 and 443, respectively.

The four respective digital ABC units 440, 441, 442 and 443 process the digital signal with respective temporal periodicities of the process of N(XI), N(XQ), N(YI) or N(YQ) times one symbol period of the digital signal. When the transmitter DSP 320 is used in the transmitter 300, the digital ABC units 440, 441, 442 and 443 process the digital signal so that the lightwave signal 302 of symbol rate F contains frequencies component of F/N(XI), F/N(XQ), F/N(YI) and F/N(YQ).

The synchronization unit 411 gathers timing information from the digital ABC units 440, 441, 442 and 443 which includes the information of the process start and periodicity, and whether the unit is processing or passing through the signal.

The synchronization unit 411 provides information on the synchronization of the digital ABC unit 440 to the I bias control unit 331 of the ABC circuit 330, on the synchronization of the digital ABC unit 441 to the Q control unit 332, on the synchronization of both digital ABC units 440 and 441 to the phase control unit 333.

Also, the synchronization unit 411 provides information on the synchronization of the digital ABC unit 442 to the I control unit of the ABC circuit 340, on the synchronization of the digital ABC unit 443 to the Q control unit of the ABC circuit 340 and on the synchronization of the digital ABC units 442 and 443 to the control unit of the angle of quadrature of the ABC circuit 340.

An external control signal input to the control unit 410 enables to control the transmitter DSP 320 and to reconfigure the transmitter DSP 320. The control unit 410 can control and re-configure the SER/DES unit 420, the coding and FEC unit 421 according to the selected modulation format and the digital RZ carving unit 430 according to the selected signal shape configuration.

The control unit 410 can control and re-configure the linear pre-distortion unit 431 according to the selected amount and nature of linear impairments to be compensated and the nonlinear pre-distortion unit 432 according to the selected conditions and parameters.

The control unit 410 can control and re-configure the TX imperfection pre-compensation unit 433 according to stored transmitter properties, the four digital ABC units 440 to 443 and the four DACs 450 to 453 as well as the synchronization unit 411.

Figure 3:
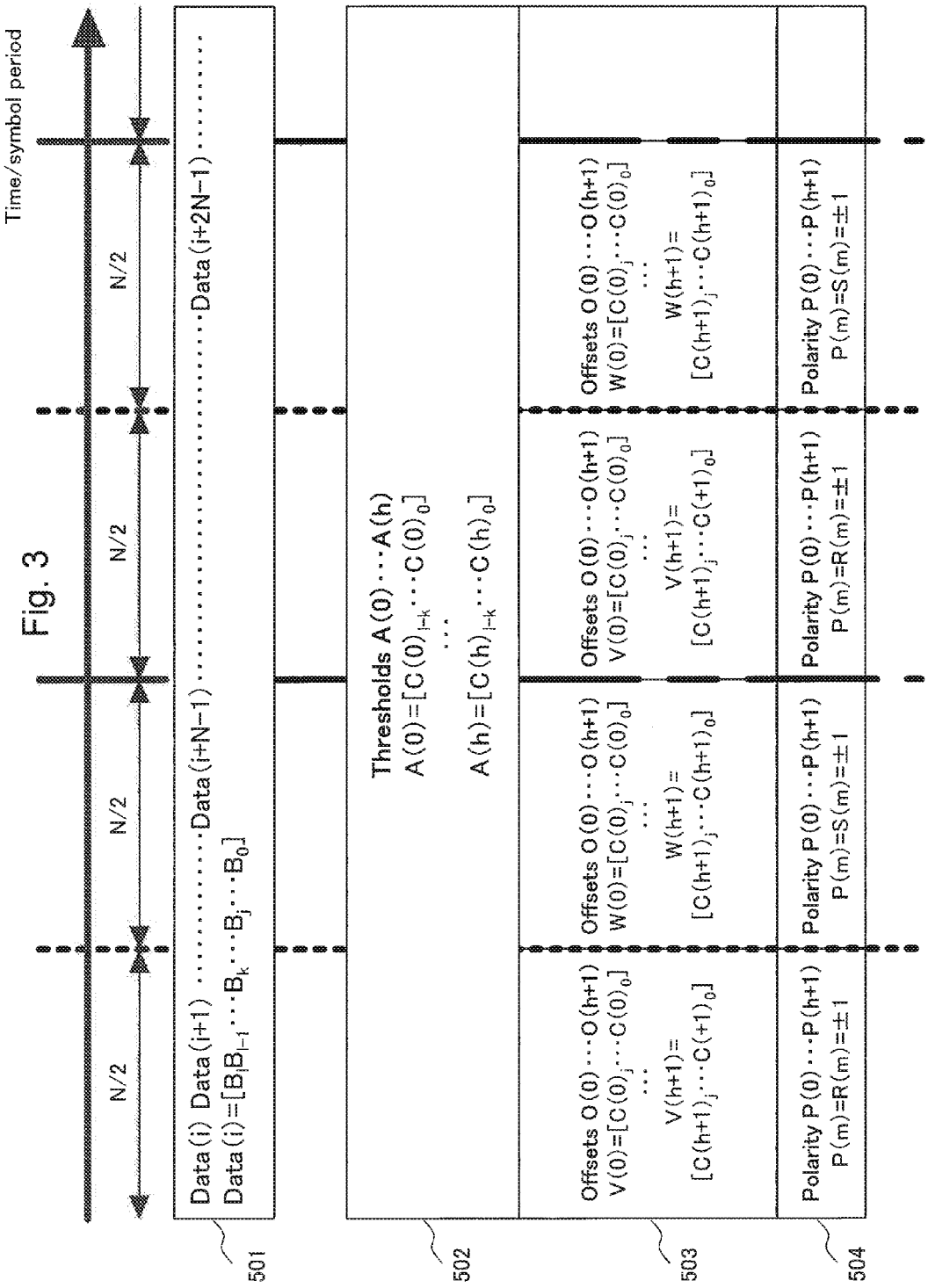
FIG. 3 A time chart which represents the timing of definitions in the data processing of the digital ABC units according to the first exemplary embodiment.

FIG. 3 is a time chart which represents the timing of definitions in the data processing of the digital ABC units 440, 441, 442 and 443 according to the first exemplary embodiment. The input data 501 is composed of L bits, where L is an integer which is chosen with respect to the data format of the transmitter DSP 320.

Considering a modulator control processing unit similar to digital ABC unit 440 characterized with the integer N, the processing unit has a set of constant noted 502 and two sets of variables 503 and 504.

The constant set 502 includes the threshold set of h+1 values noted A(0) to A(h) where h is an integer. Each value of A(m) of the threshold set is a (L-k) bit data. Here, m is equal to or greater than 0 and is equal to or less than h, and, L and k are integers so that L>k. The constants A(0) to A(h) are sorted in an ascending order.

The variable set 503 includes the offset set and comprises h+2 values noted O(0) to O(h+1). Each value O(m) of the offset set is a j bit data where j is an integer and j is related to the integers L and k by the relation j<k<L.

Finally, the variable set 504 includes the polarity set and comprises h+2 values noted P(0) to P(h+1). Each value P(m) of the offset can be coded binary data of one bit. That is, P(m) represents positive sign (+1) or negative (−1) sign.

The values of the variable sets O(0) to O(h+1) 503 and P(0) to P(h+1) 504 are updated simultaneously several times with a temporal periodicity of N times one symbol period. For instance, the variable sets O(0) to O(h+1) 503 and P(0) to P(h+1) 504 are updated twice, each time after N/2 times the symbol period. In the first half of the periodicity, the offset variable set O(0) to O(h+1) is defined with a set of h+2 constant values of j bits noted V(0) to V(h+1). In the second half of the periodicity, the offset variable set O(0) to O(h+1) 503 is defined with a set of h+2 constant values of j bits noted W(0) to W(h+1).

The polarity variable set P(0) to P(h+1) 504 is simultaneously defined the first half of the periodicity with a set of h+2 constant values noted R(0) to R(h+1) and second half of the periodicity with a set of h+2 constant values noted S(0) to S(h+2). The constant sets A(0) to A(h), V(0) to V(h+1), W(0) to W(h+1), R(0) to R(h+1), S(0) to S(h+1) can be redefined by a an external control.

Figure 4:
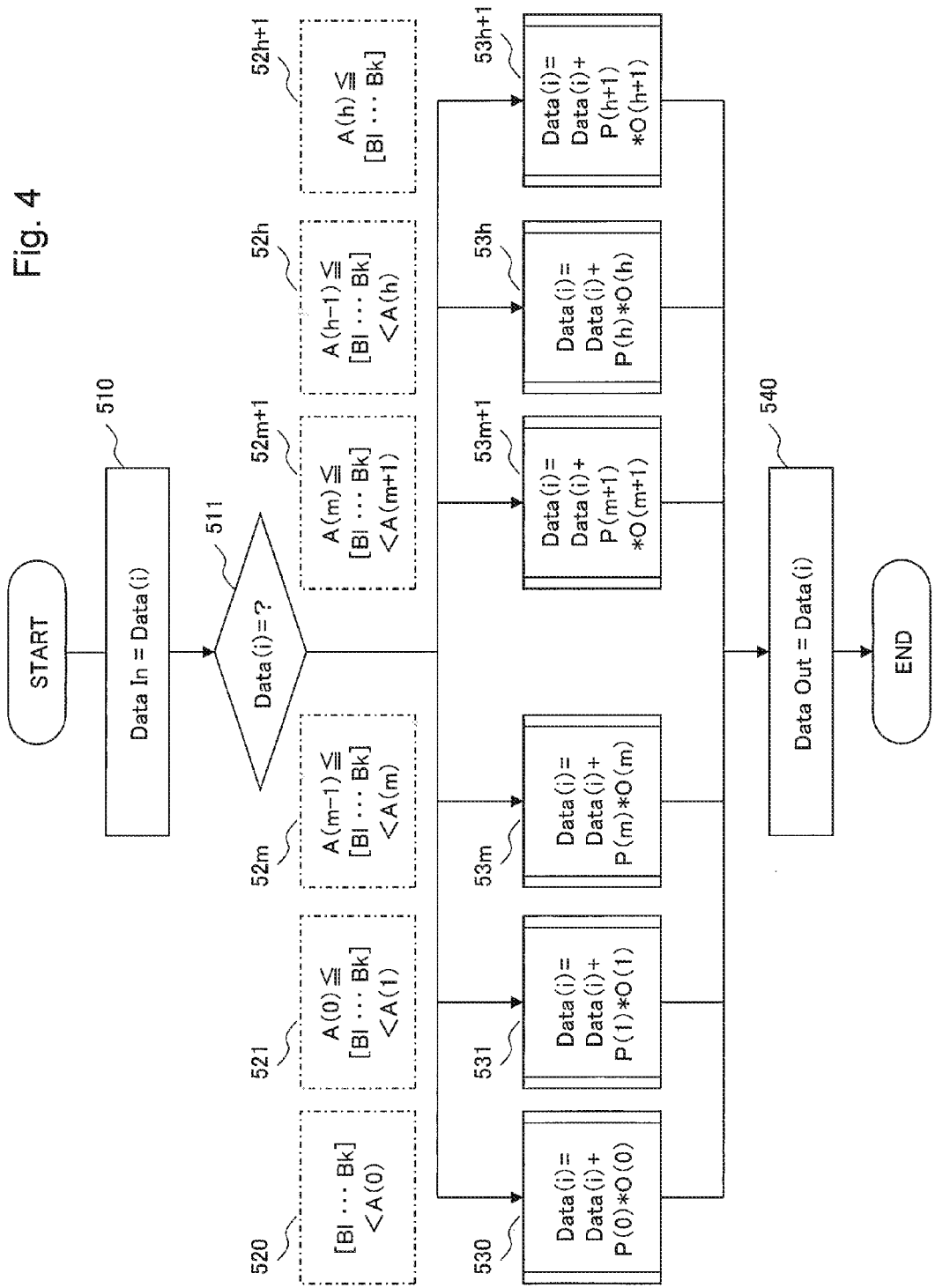
FIG. 4 A flow chart representing the digital process shown in FIG. 3

FIG. 4 is a flow chart representing the digital process shown in FIG. 3. A digital signal processing starts at the data providing from the former digital signal process 510. The operation 511 is an evaluation of the L-k Most Significant Bits (MSB) of the processed data. The L-k MSB of the processed data are compared to the threshold values A(0) to A(h) defined on FIG. 3. The h+2 cases of the comparison results 520 to 52h+1 are shown in FIG. 4. For the respective case 520 to 52h+1, the respective 530 to 53h+2 process is applied to the data.

In the first case 520, where the L-k MSB are lower than the least threshold A(0), the operation 530 is performed on processed data.

From the second case to the penultimate cases 521 to 52h, there are two threshold values A(m) and A(m+1) corresponding to the case 52m+1. At the case 52m+1, the L-k MSB of the processed data is greater than or equal to A(m)

and is less than A(m+1). In this case, the process 53m+1 is applied to the data. In the last case 52h+1, the L-k MSB of the data is greater than or equal to the greatest of the thresholds A(h), and the process 53h+1 is applied to the data.

For a case 53m of the 530 to 53h+1 case collection, if the polarity P(m) is positive, the offset value O(m), which has j bits, is added to the j bits of Least Significant Bits (LSB) of the processed data.

If the polarity P(m) is negative, the offset value O(m) is subtracted from the j bits of the LSB of the processed data. It should be noted that if the value O(m) is null, the polarity P(m) can be either positive or negative with the same result.

At the process 540, the result of one of the process among processes 530 to 53h+1 is output by the processing unit for each of Data(i). It should be noted that the processes represented on FIG. 4 can be easily implemented on a DSP unit with limited resource amount.

Figure 5:
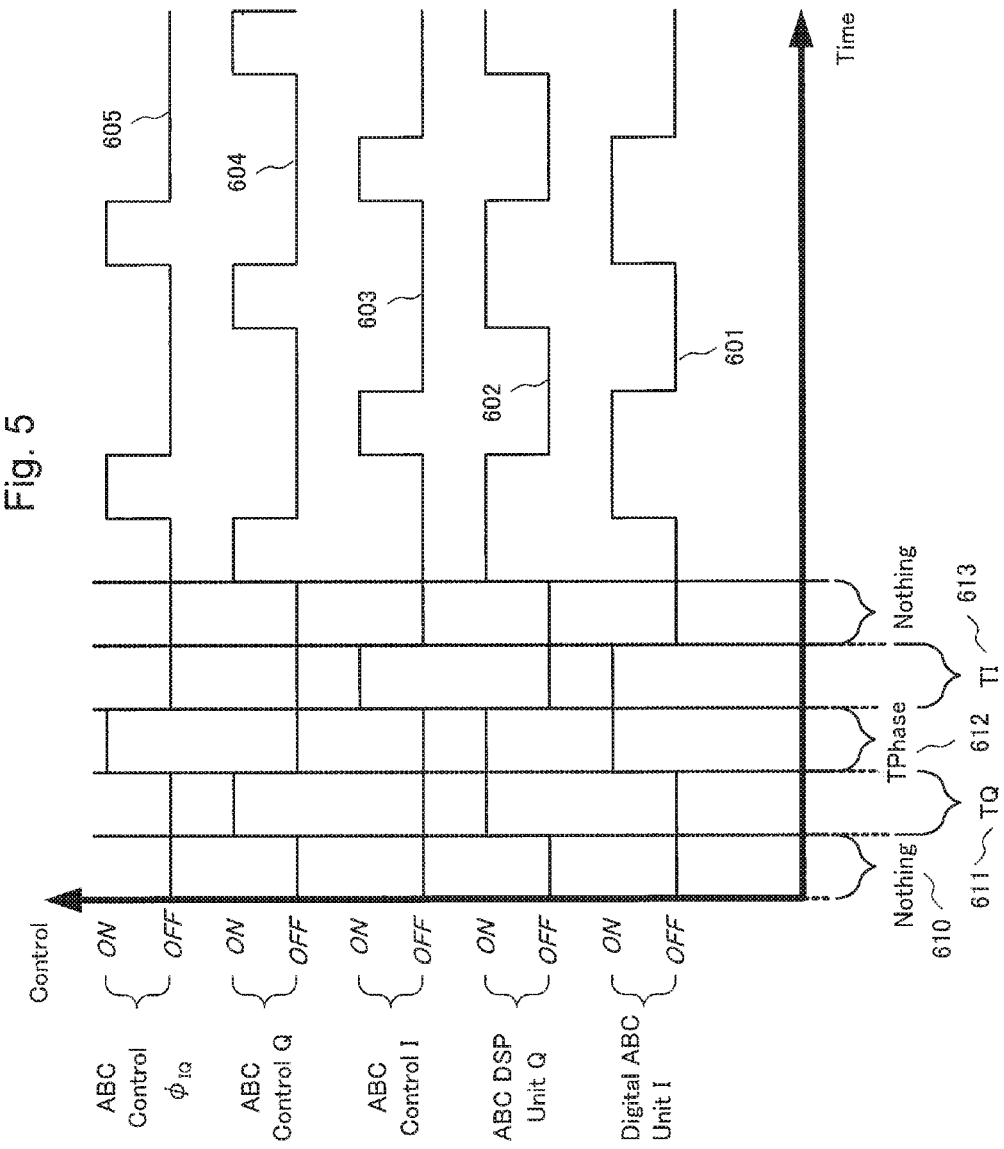
FIG. 5 A time chart of the operation of the transmitter of FIG. 1.

FIG. 5 is a time chart of the operation of the transmitter 300 of FIG. 1. The transmitter DSP 320 described on FIG. 2 is used in the transmitter 300.

Here, the numbers N(XI), N(XQ), N(YI) and N(YQ) which characterizes the digital ABC units 440, 441, 442 and 443 are chosen as all equal to an integer N. The filter units 334, 335 and 336 are band pass filters centered around the frequency F/N, where F is a real number and is the symbol rate of the signal emitted by the transmitter 300.

The curve 601 represents the state of the digital ABC units 440 and 442. The curve 602 represents the state of the digital ABC units 441 and 443. The curve 603 represents the state of the I bias control unit 331 of the ABC circuit 330 and of the bias I control of the ABC circuit 340. The curve 604 represents the state of the bias Q control 332 of the ABC circuit 330 and of the bias Q control of the ABC circuit 340. The curve 605 represents the state of the phase control unit 333 of the ABC circuit 330 and of the control of the angle of quadrature of the ABC circuit 340.

As the ABC circuits 330 and 340 use independent monitor PDs of the DP-IQ modulator 311, the ABC circuits 330 and 340 can control the bias of the modulator simultaneously while the digital ABC units 440 and 442, or, digital ABC units 441 and 443 operate simultaneously with equal characteristic N. The curves 601 and 602 shows clock signals with identical frequency and a relative phase difference of 90 degrees.

The frequency of the clocks is taken as lower than F/N. For instance, the frequency of the curves 601 and 602 is taken as 100 Hz for F=32 Gbaud and N=30000.

In the time interval 610, the digital ABC units 440, 441, 442 and 443 are off, i.e. the digital ABC units 440, 441, 442 and 443 pass through data without processing the data. Alternatively, the digital ABC units in off state may be bypassed. During this interval, the all of the digital ABC units are off and no bias is controlled.

In the time interval 611, the digital ABC units 441 and 443 are on, while the digital ABC units 440 and 442 are still off. In this interval, the bias Q control of the ABC units 330 and 340 are on, while all other controls of the ABC circuits are off. During the interval 611, the Q biases on each polarization of the DP-IQ modulator 311 are controlled.

In the interval 612, all digital ABC units 440, 441, 442 and 443 are on. In this interval, the bias control of the angle of quadrature of the ABC circuits 330 and 340 are on, while all other controls of the ABC circuits are off. During the interval 612, the angles of quadrature on each polarization of the modulator 311 are controlled.

In the interval 613, digital ABC units 440 and 442 are on, while the digital ABC units 441 and 443 are off. In this interval, the bias I control of the ABC circuits 330 and 340 are on, while all other controls of the ABC circuits are off. During the interval 613, I bias on each polarization of the modulator 311 are controlled. Consecutive time is composed of repetitions of intervals 610, 611, 612 and 613.

As described above, the digital ABC units 440 to 443, the bias I control, the bias Q control and the bias control of the angle of quadrature of the ABC circuits 330 and 340 repeat the state "on" and "off" synchronizing to the clock with identical frequency described as the curves 601 to 605.

Figure 6:
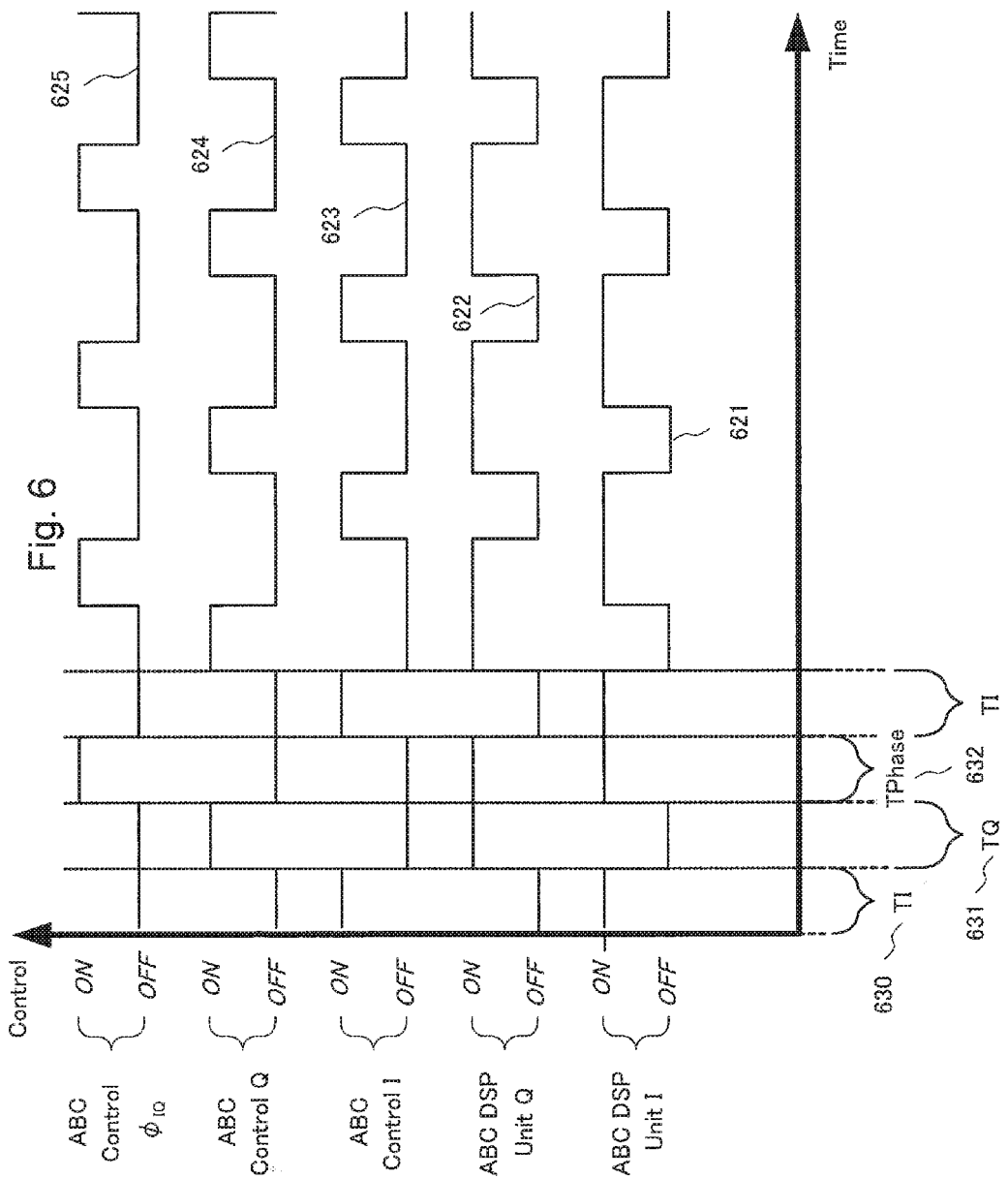
FIG. 6 Another time chart of the operation of the digital transmitter of FIG. 1.

FIG. 6 is another time chart of the operation of the transmitter of FIG. 1. Here, the numbers N(XI), N(XQ), N(YI) and N(YQ) characterizing the digital ABC units 440, 441, 442 and 443 are chosen as all equal to an integer N.

The curve 621 represents the state of the digital ABC units 440 and 442. The curve 622 represents the state of the digital ABC units 441 and 443. The curve 623 represents the state of the I bias control 331 of the ABC circuit 330 and of the I bias control of the ABC circuit 340. The curve 624 represents the state of the Q bias control 332 of the ABC circuit 330 and of the Q bias control of the ABC circuit 340. The curve 625 represents the state of the phase control unit 333 of the ABC circuit 330 and of the control of the angle of quadrature of the ABC circuit 340.

The curves 621 and 622 are clock signal with duty cycle of ⅔, with identical frequency and a relative phase of 120 degrees.

In the time interval 630, the DSP units 440 and 442 are on, while the units 441 and 443 are still off. In this interval, the I bias control of the ABC circuits 330 and 340 are on, while all other controls of the ABC are off. During the interval 630, the I biases on each polarization of the modulator 311 are controlled.

In the interval 631, the digital ABC units 441 and 443 are on, while the digital ABC units 440 and 442 are off. In this interval, the Q bias control of the ABC circuits 330 and 340 are on, while all other controls of the ABC circuits are off. During the interval 631, Q bias on each polarization of the modulator 311 are controlled.

In the interval 632, all DSP units 440, 441, 442 and 443 are on. In this interval, the bias control of the angle of quadrature of the ABC circuits 330 and 340 are on, while all other controls of the ABC circuits are off. During the interval 632, the angles of quadrature on each polarization of the modulator 311 are controlled. Consecutive time is composed of repetitions of intervals 630, 631 and 632.

As described above, the digital ABC units 440 to 443, the I bias control, the Q bias control and the bias control of the angle of quadrature of the ABC circuits 330 and 340 repeat the state "on" and "off" synchronizing to the clock with identical frequency described as the curves 621 to 625.

Figure 7:
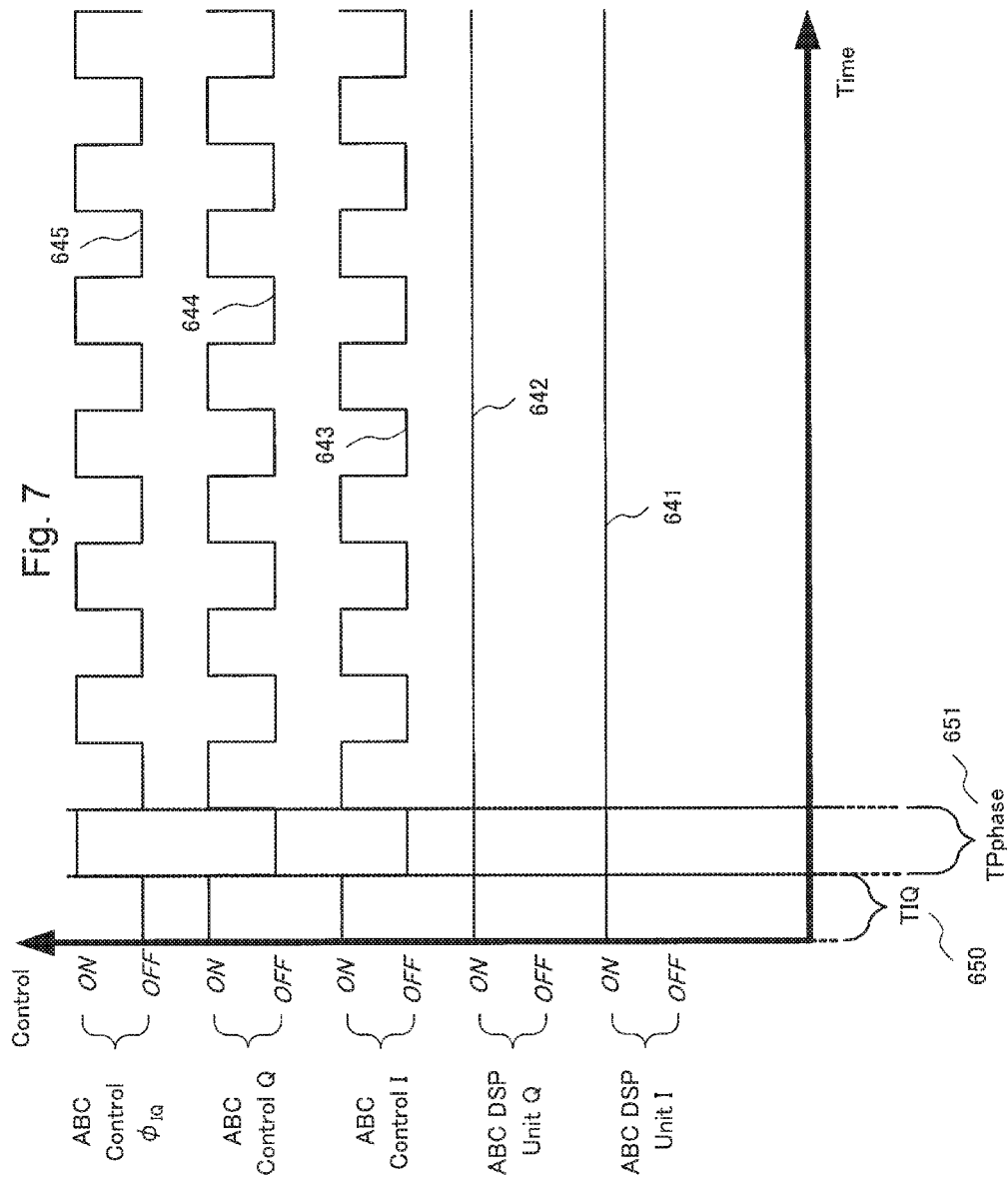
FIG. 7 Another time chart of the operation of the digital transmitter of FIG. 1.

FIG. 7 is another time chart of the operation of the digital transmitter of FIG. 1. Here, the numbers N(XI) and N(YI) characterizing the process units 440 and 442 are chosen as equal to the integer N, while the numbers N(XQ) and N(YQ) characterizing the process units 441 and 443 are chosen as equal to 2N (two multiplied by N).

The filter I 334 and filter ϕIQ 336 are band pass filters centered around the frequency F/N. The filter Q 335 is a band pass filters centered around the frequency F/2N, while the numbers N(XQ) and N(YQ) are 2N.

The curve 641 represents the state of the digital ABC units 440 and 442. The curve 642 represents the state of the digital ABC units 441 and 443.

The curve 643 represents the state of the I bias control 331 of the ABC circuit 330 and of the I bias control circuit of the ABC circuit 340. The curve 644 represents the state of the Q bias control 332 of the ABC circuit 330 and of the Q bias control of the ABC circuit 340. The curve 645 represents the state of the phase control unit 333 of the ABC circuit 330 and of the control of the angle of quadrature of the ABC circuit 340. The curves 641 and 642 are constant with high value.

In the time interval 650, all the digital ABC units 440, 441 442 and 443 are on. In this interval, the I bias control and the Q bias control of the ABC circuits 330 and 340 are on, while the control of angle of quadrature ABC is off. During the interval 650, the I biases and Q biases on each polarization of the modulator 311 are controlled simultaneously.

In the interval 651, all the DSP units 440, 441, 442 and 443 are on. In this interval, the bias control of the angle of quadrature of the ABC circuits 330 and 340 are on, while all other controls of the ABC are off. During the interval 651, the angles of quadrature on each polarization of the modulator 311 are controlled. Consecutive time is composed of repetitions of intervals 650 and 651.

According to the case of FIG. 7, the digital ABC units 440 to 443 are always on. The I bias control, the Q bias control and the bias control of the angle of quadrature of the ABC circuits 330 and 340 repeat the state "on" and "off" synchronizing to the clock with identical frequency described as the curves 643 to 645. Since the numbers for characterizing the digital ABC units 440 and 442 are N and that for digital ABC units 441 and 443 are 2N, each of the error signals for XI, XQ, YI, YQ signal can be identified.

Next, an example of operation is explained. The transmitter 300 of FIG. 1 is a reconfigurable digital transmitter of symbol rate F of 32 GBaud. The transmitter 300 operates according to the time chart of FIG. 6. The number N is taken equal to 4096. The data in the transmitter DSP 320 is 8 bit data ranging from 0 to 255. The digital ABC units 440, 441, 442 and 443 have identical settings. Namely, the number h is taken as h=1 to provide two thresholds values A(0)=64 and A(1)=192.

The number j is taken as j=1 so that the offsets are only one bit values. The first set of offset values is equal to {V(0)=1, V(1)=1, V(2)=1} and the second set of offset values is equal to {W(0)=1, W(1)=1, W(2)=1}. The first set of polarity values are {R(0)=1, R(1)=−1, R(2)=1} while the second set of polarity values is {S(0)=−1, S(1)=1, S(2)=−1}. The DSP 320 provides synchronization signal equals to the present polarity variable set P(0) to P(h+1) (i.e. one of R(0), R(1), R(2), S(0), S(1) or S(2)) depending on the result of comparing the data and the threshold values A(0) to A(h).

In the configuration of F=32 Gbaud and N=4096, the first set of the offset values is {V(0)=1, V(1)=1, V(2)=1} and the first set of the polarity values is {R(0)=1, R(1)=−1, R(2)=1} for the first 2048 symbol of the data. And, the second set of the offset values is {W(0)=1, W(1)=1, W(2)=1} and the second set of polarity values is {S(0)=−1, S(1)=1, S(2)=−1} for the second 2048 symbol of the data. Accordingly, the frequency of varying the offset values and the frequency of varying the polarity is equal to F/N, that is, around 7.8 MHz (=32 Gbaud/4096). The synchronization signal shows the phase of the variation of the offset value to the signal added by the above procedure.

When the set of the offset values is {V(0)=1, V(1)=1, V(2)=1} and the set of the polarity values is {R(0)=1, R(1)=−1, R(2)=1}, the data (Data(i) to Data(i+2N−1)) is processed in the transmitter DSP 320 as follows.

(a1) If the value of the data is less than 64, V(0)(=1) is added to the LSB of the data because R(0)=1.

(a2) If the value of the data is greater than or equal to 64 and less than 192, V(1)(=1) is subtracted from the LSB of the data because R(1)=−1.

(a3) If the value of the data is greater than or equal to 192, V(1)(=1) is added to the LSB of the data because R(2)=1.

When the set of the offset value is {W(0)=1, W(1)=1, W(2)=1} and the set of the polarity values is {S(0)=−1, S(1)=1, S(2)=−1}, the data is processed as follows.

(b1) If the value of the data is less than 64, W(0)(=1) is subtracted from the LSB of the data because S(0)=−1.

(b2) If the value of the data is greater than or equal to 64 and less than 192, W(1)(=1) is added to the LSB of the data because S(1)=1.

(b3) If the value of the data is greater than or equal to 192, W(1)(=1) is subtracted from the LSB of the data because R(2)=−1.

According to the processing (a1) to (a3) and (b1) to (b3), the LSB of the data varies by 1 bit with frequency F/N because the distribution of data varies every N/2 period. As the result, the monitor signals (monitor (X) and monitor (Y)) generated by the monitor PDs have the frequency F/N. Therefore, the ABC circuits 330 and 340 can control the DC bias (X) and DC bias (Y) based on the monitor signals output from the filters in ABC circuits 330 and 340.

Next, the distributions of the output of the driver amplifier in various modulation methods are explained.

Figure 8:
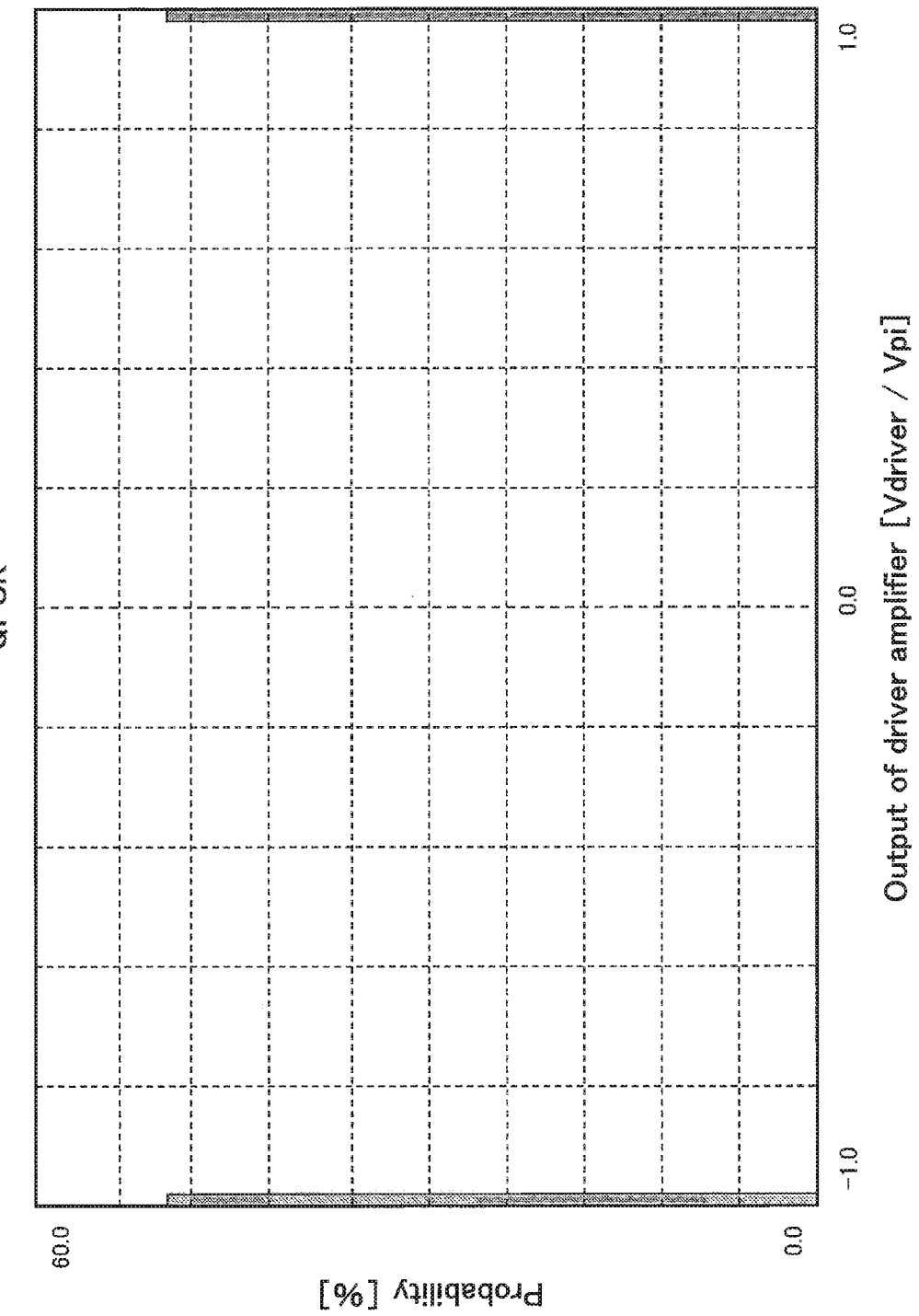
FIG. 8 A summary of characteristics of signals in different configurations used to drive the modulator of a digital transmitter (QPSK).

In a first configuration, the transmitter 300 is configures to generate QPSK signal. The coding and FEC unit 421 is set to code the QPSK data. The digital RZ carving unit 430, the linear pre-distortion unit 431 and nonlinear pre-distortion unit 432 are turned off. FIG. 8 represents the distribution of the output of the driver amplifiers 316, 317, 318 and 319 (Vdriver) normalized by Vpi relatively to the modulator 311. The signal has two values Vdriver/Vpi=1 and Vdriver/Vpi=−1 with equal probability.

In the following figures FIG. 9 to FIG. 12, each of the distribution of the output of the driver is symmetrical about the axis of Vdriver/Vpi=0. Therefore, each of the distributions in FIG. 9 to FIG. 12 can be expressed by superposition of the distribution of FIG. 8.

Figure 9:
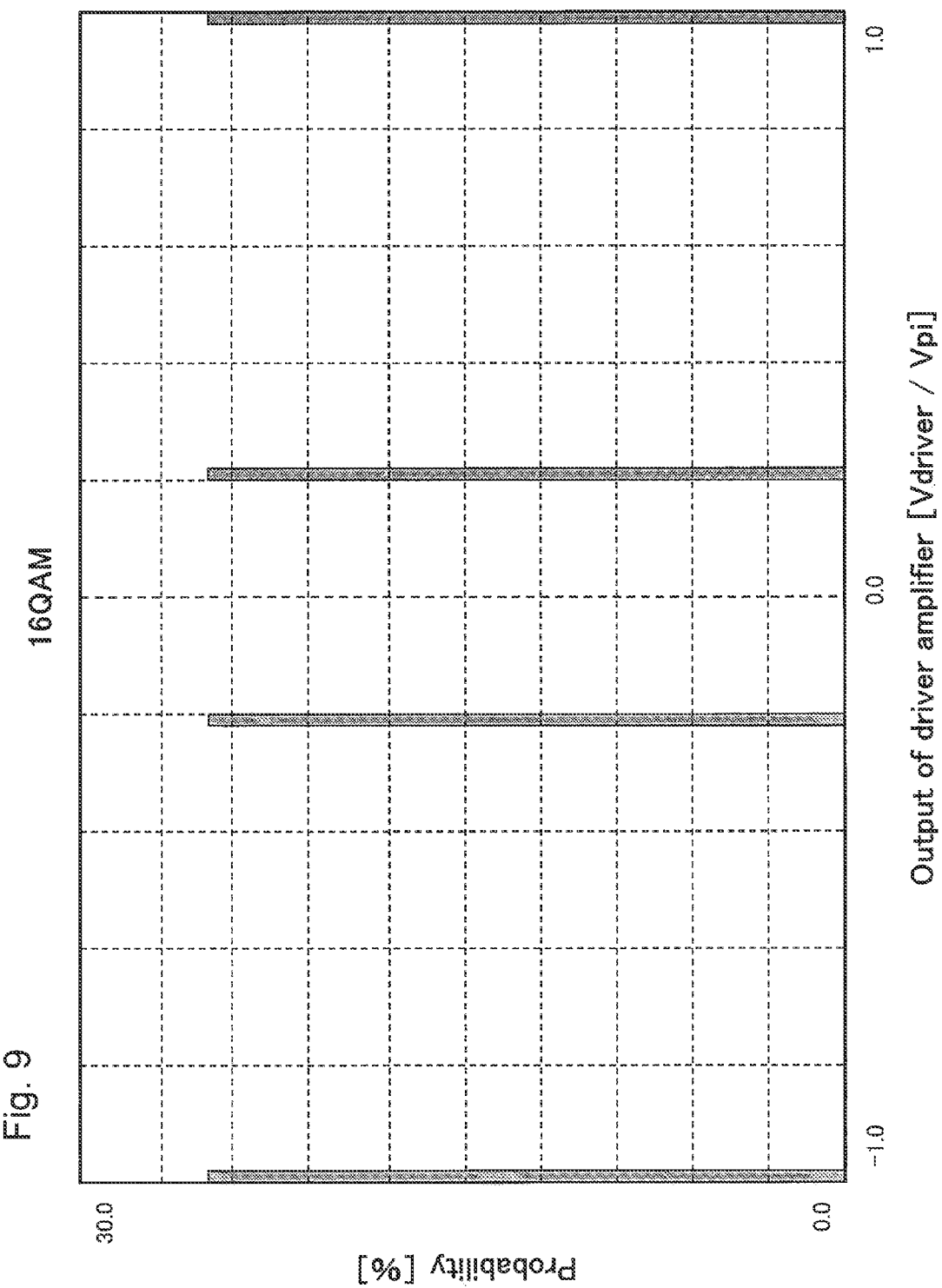
FIG. 9 A summary of characteristics of signals in different configurations used to drive the modulator of a digital transmitter (16QAM).

In a second configuration, the transmitter 300 emits 16QAM signal. The coding and FEC unit 421 is set to code 16QAM data. The digital RZ carving unit 430, the linear pre-distortion unit 431 and the nonlinear pre-distortion unit 432 are turned off. FIG. 9 represents the distribution of the output of the drivers 316, 317, 318 and 319 normalized by Vpi of the modulator 311. The signal has four values with equal probability.

In this case, the distribution of FIG. 9 can be expressed by superposition of FIG. 8 when Vdriver/Vpi is equal to +1 and −1" and Vdriver/Vpi is equal to +0.2 and −0.2. As explained by FIG. 18, the monitor signal when Vdriver/Vpi are +1 and −1 is shown as curve 211 and the monitor signal when Vdriver/Vpi are +0.2 and −0.2 is shown as similar to curve 217 of FIG. 18. As the result, the monitor signals of Vdriver/Vpi are 1 and −1 and of Vdriver/Vpi are +0.2 and −0.2 offset the total of the monitor signals when the known art is applied.

In the present embodiment, the above-explained procedures (a1) to (a3) and (b1) to (b3) is applied to the data. The value 0 of the data corresponds to Vdriver/Vpi are −1 and the value 255 of the data corresponds to Vdriver/Vpi are +1 of FIG. 9.

Therefore, while the first set of the values (V(0) to V(2) and R(0) to R(2)) are used, when the value of the data is less than 64 or is greater than or equal to 192, the value "1" is added to the LSB of the data, and when the value of the data is greater than or equal to 64 and is less than 192, the value "−1" is added to the LSB of the data.

In the same way, while the second set of the values (W(0) to W(2) and S(0) to S(2)) are used, when the value of the data is less than 64 or is greater than or equal to 192, the value "−1" is added to the LSB of the data, and when the value of the data is greater than or equal to 64 and is less than 192, the value "1" is added to the LSB of the Data(i). Accordingly, as explained before, the monitor signals (monitor (X) and monitor (Y)) with the frequency of F/N is generated. The principle of generating the monitor signals are common with other signal formats shown in FIG. 10 to FIG. 12.

Figure 10:
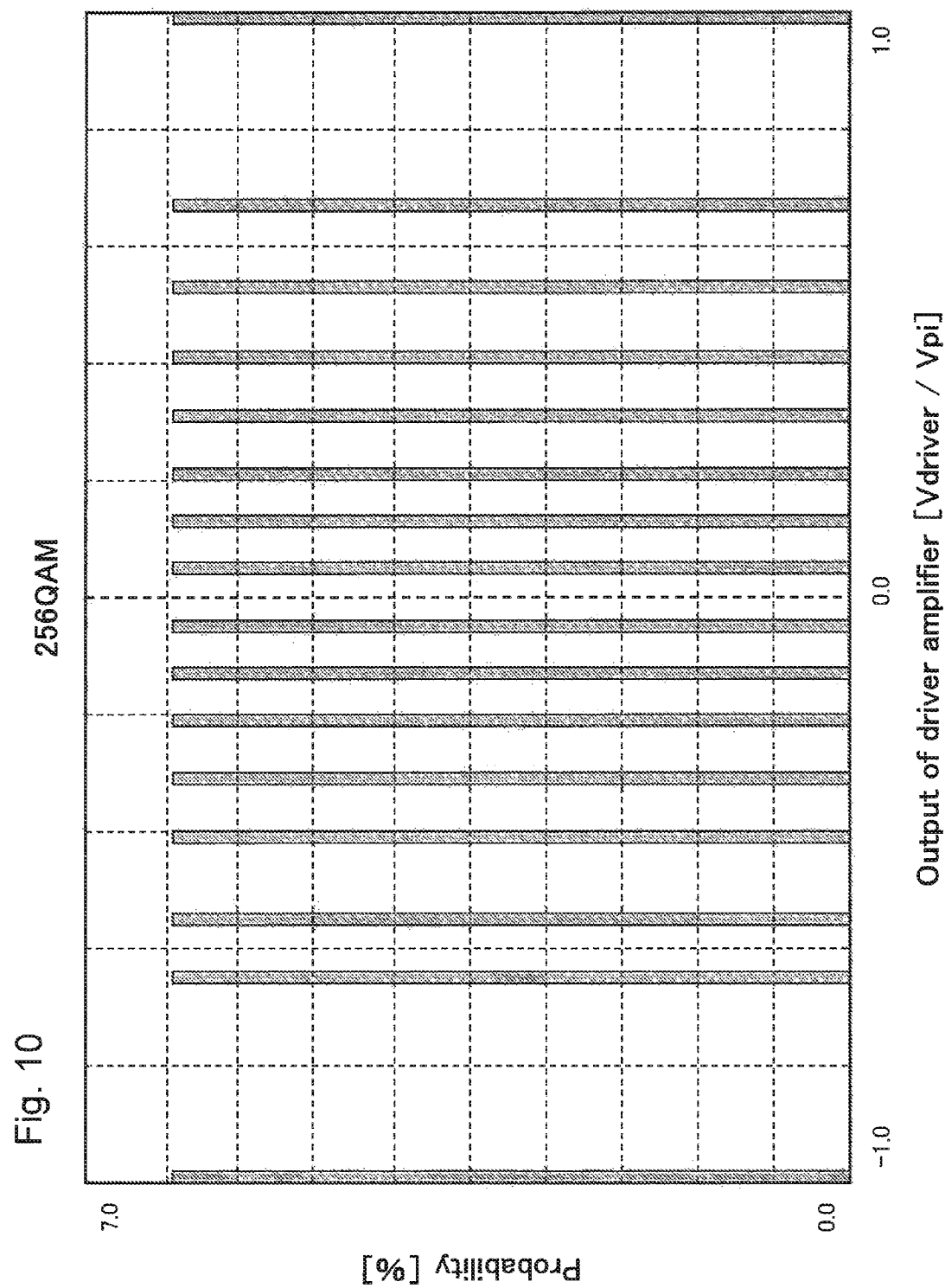
FIG. 10 A summary of characteristics of signals in different configurations used to drive the modulator of a digital transmitter (256QAM).

In a third configuration, the transmitter 300 emits 256QAM signal. The coding and FEC unit 421 is set to code 256QAM data. The digital RZ carving unit 430, the linear or nonlinear pre-distortion units 431 and 432 are turned off. FIG. 10 represents the distribution of the output of the drivers 316, 317, 318 and 319 normalized by Vpi relatively to the modulator 311. The signal has sixteen values with equal probability distributed between 1 and −1.

Figure 11:
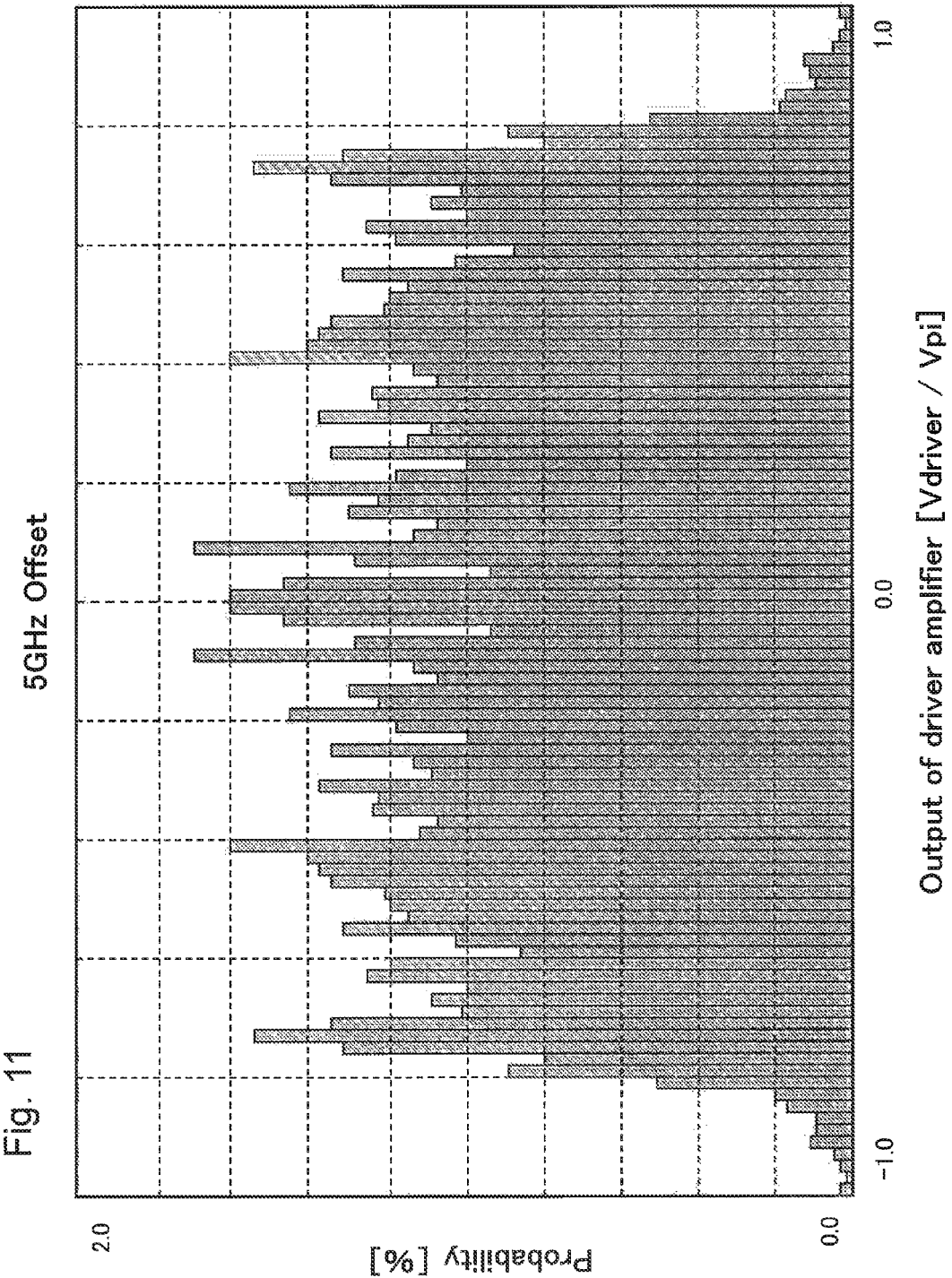
FIG. 11 A summary of characteristics of signals in different configurations used to drive the modulator of a digital transmitter (QPSK modulation in with 5 GHz offset).

In a fourth configuration, the transmitter 300 emits QPSK signal with inter-polarization digital frequency offsetting of 5 GHz. The coding and FEC unit 421 is set to code QPSK data. Further, the digital RZ carving unit 430 is turned on. The linear pre-distortion unit 431 is turned off. The nonlinear pre-distortion unit 432 is configured to apply inter-polarization digital frequency offsetting of 5 GHz. FIG. 11 represents the distribution of the output of the drivers 316, 317, 318 and 319 normalized by Vpi relatively to the modulator 311. The signal has a discrete value distribution.

Figure 12:
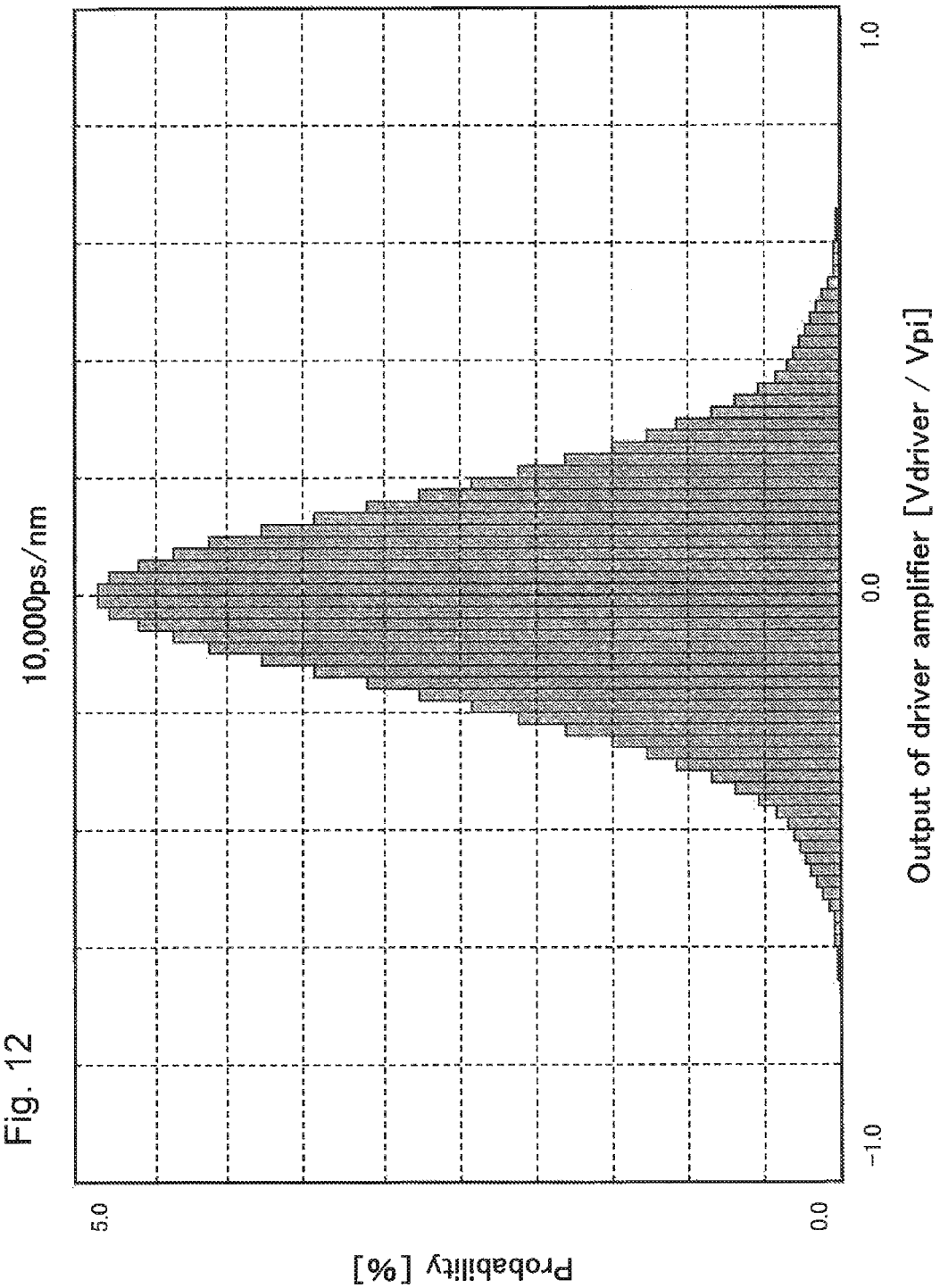
FIG. 12 A summary of characteristics of signals in different configurations used to drive the modulator of a digital transmitter (QPSK modulation with pre-compensation of 10,000 ps/nm of CD).

In a fifth configuration, the transmitter 300 emits QPSK signal with pre-distortion of 10,000 ps/nm of CD. The coding and FEC unit 421 is set to code QPSK data. The digital RZ carving unit 430 is turned off. The linear pre-distortion unit 431 is turned on and the linear pre-distortion unit 431 is configured to pre-compensate 10,000 ps/nm of CD in frequency domain. The nonlinear pre-distortion unit 432 is turned off. FIG. 12 represents the distribution of the output of the drivers 316, 317, 318 and 319 normalized by Vpi relatively to the modulator 311. The signal has a discrete value distribution.

As shown in FIGS. 8 to 12, the output of the drivers 316 to 319 takes many discrete values. These figures show that the amplitude of the drivers ranges 0 to 2 Vpi and shows that their PAPR is less than 100%. Therefore, as explained using FIG. 18, the known ABC control might not be stabilized when the modulation method that includes the case of the driver output (Vdriver) is nearly equal to or less than Vpi.

In contrast, the transmitter 300 of the present exemplary embodiment adopts DSP to process the digital data to be modulated according to the above-explained processing steps, the transmitter 300 is able to imprint frequency components that can be used to control the modulator biases independent of the PAPR of the driving signal.

Figure 18:
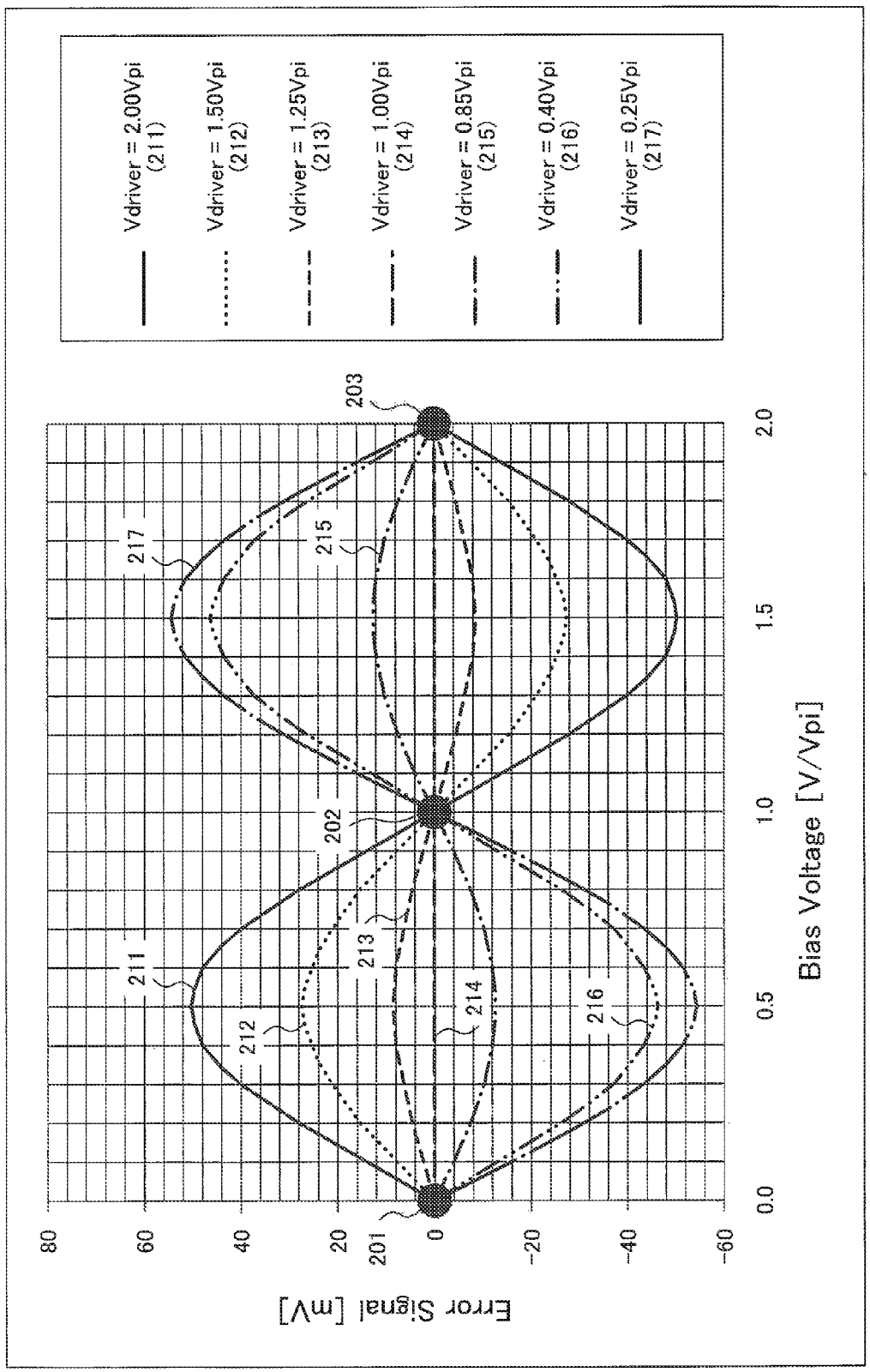
FIG. 18 Summary of simulation results of the monitor signals used by the ABC circuit of FIG. 17.

In the transmitter 300, the offset value to the data varies depending on the amplitude of the data. For example, the offset value is +1 when data is less than A(0) or equal to or greater than A(1) and the offset value is −1 when data is equal to or greater than A(0) or less than A(1) during the first N/2 period according to FIG. 3 and FIG. 4. The procedure described in these figures mitigates the effect that the amplitude of the monitor signals are reduced or inverted as shown in FIG. 18.

Next, the result of simulation of the monitor signals for the present embodiment is explained.

Figure 13:
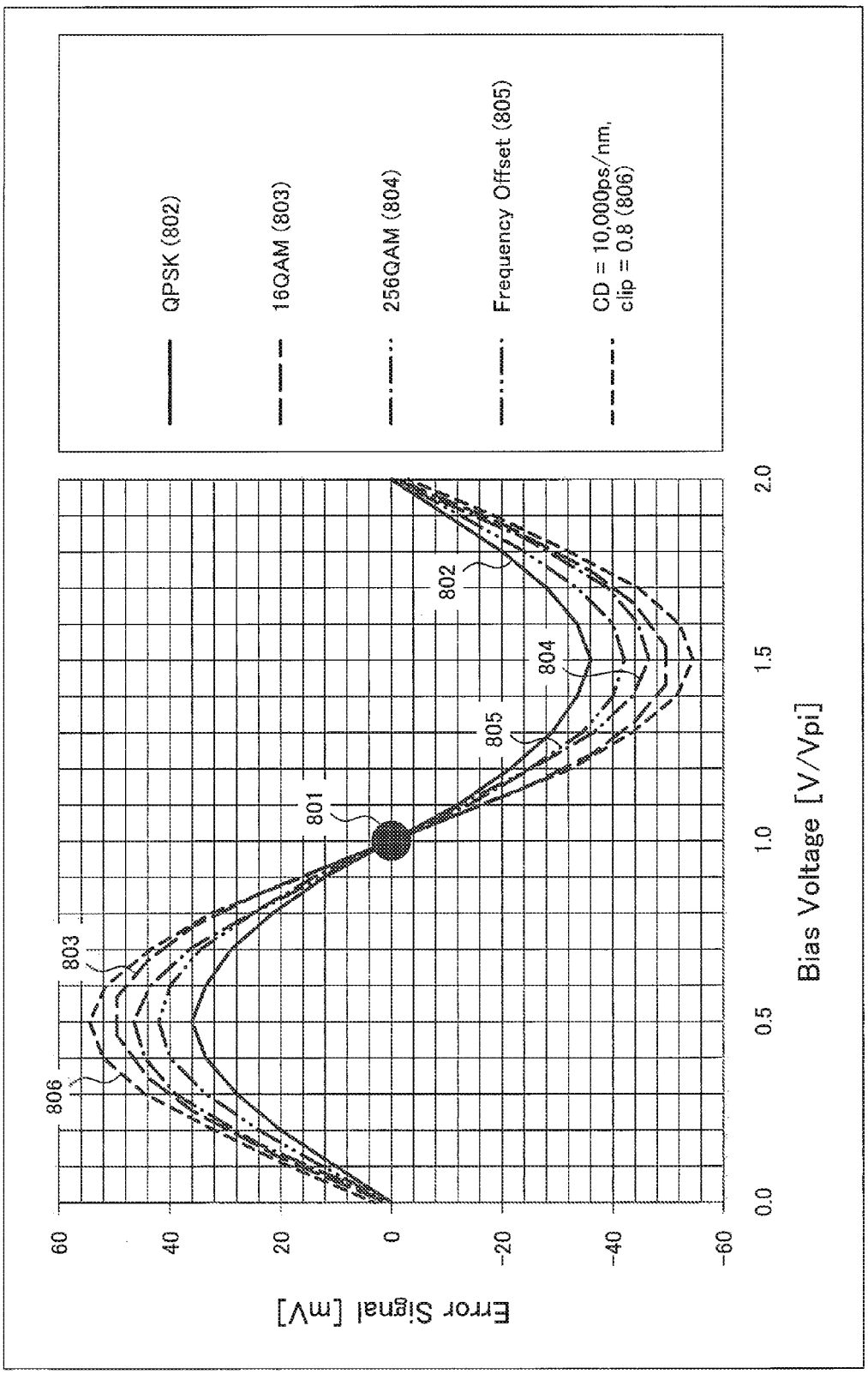
FIG. 13 A summary of simulation results of the control of the bias of children MZM for the configurations of FIGS. 8 to 12.

FIG. 13 is a summary of simulation results of the control of the bias of children MZM for the configurations of FIGS. 8 to 12. FIG. 13 shows the simulation results of the error signals provided to the respective I bias control unit 331 and Q bias control unit 332 of the ABC circuit 330. The error signal is calculated as the product of the amplitude of the output of the corresponding filter by the synchronization signal. The synchronization signal shows the phase of the extracted signal. The curves 802, 803, 804, 805 and 806 are the error signals plotted against the respective I and Q biases. The point 801 is the optimal bias point of Vpi.

The curve 802 is the result of the simulation of the error signal when the transmitter 300 is set according to the conditions of FIG. 8, for QPSK. Between the points of the bias voltage is 0 and Vpi, the extracted monitor signal has a positive phase. Therefore, the error signal generated by multiplying the monitor signal and the synchronization signal provided by transmitter DSP 320 is positive, which leads to increasing the DC bias. Between the points of the bias voltage is Vpi and 2 Vpi, the sign of the extracted monitor signal and synchronization signal are in opposite phase. Therefore, the error signal generated by multiplying synchronization signal and the monitor is negative, which leads to decreasing the DC bias. This leads to the optimal zero cross condition, where the feedback converges to the point 801, therefore a stable voltage of Vpi. It should be noted that 0 and 2 Vpi represent the same condition with the periodicity of 2 Vpi and lead to null monitor signal. However, due to the opposite phase information, these points are unstable; therefore the feedback circuit only locks and tracks the optimal DC bias of Vpi.

The curve 803 represents the conditions of the transmitter 300 corresponding to FIG. 9, for 16QAM. The monitor signal is similar to the one of curve 802, therefore the ABC circuit enables to track and lock to the optimal bias conditions.

The curve 804 represents the conditions of the transmitter 300 corresponding to FIG. 10, for 256QAM. The error signal is similar to the one of curve 802, therefore the ABC circuit enables to track and lock to the optimal bias conditions.

The curve 805 represents the conditions of the transmitter 300 corresponding to FIG. 11, for digital frequency offset. The error signal is similar to the curve 802, therefore the ABC circuit enables to track and lock to the optimal bias conditions.

The curve 806 represents the conditions of the transmitter 300 corresponding to FIG. 12, for CD pre-distortion. The error signal is similar to the one of curve 802, therefore the ABC circuit enables to track and lock to the optimal bias conditions.

Figure 14:
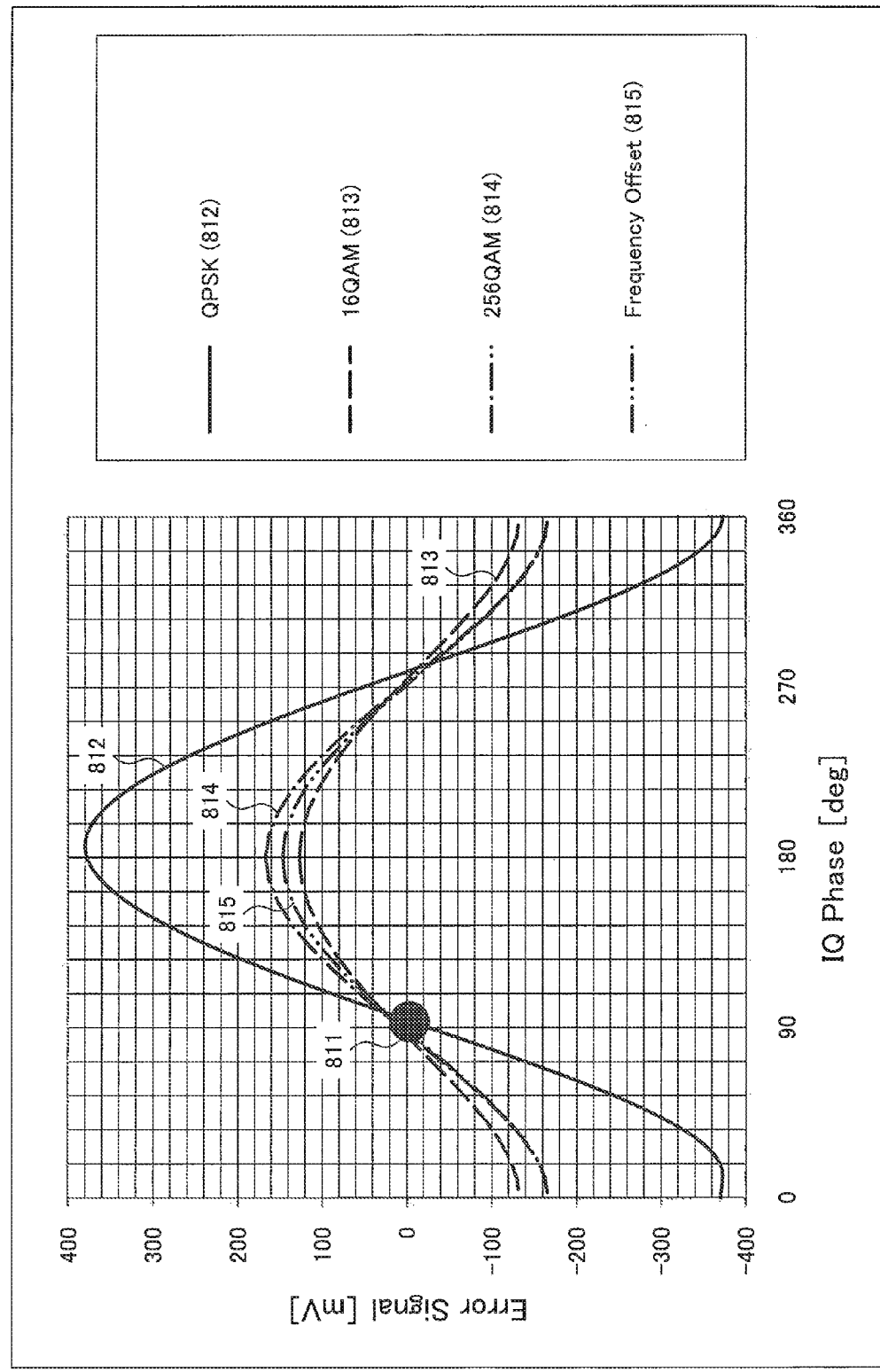
FIG. 14 A summary of simulation results of the control of the angle of quadrature of the IQ modulator for the configurations of FIGS. 8 to 11.

FIG. 14 is a summary of simulation results of the control of the angle of quadrature of the IQ modulator for the configurations of FIGS. 8 to 11. FIG. 14 shows the simulation result of the error signal provided to the phase control unit 333 of the ABC circuit 330. The curves 812, 813, 814 and 815 are the error signals plotted against the angle of quadrature. The point 811 is the optimal angle of 90 degrees.

The curve 812 is the result of the simulation when the transmitter 300 is set according to the conditions of FIG. 8 for QPSK. Between 0 degree and 90 degrees of the phase differences between I signal and Q signal (the IQ phase), the extracted monitor signal has a negative phase in the condition of the simulation. Therefore, the error signal generated by multiplying the extracted monitor signal and the inverse of the synchronization signal provided by TX DSP 320 is positive, which leads to increasing the angle. Between 90 degrees and 270 degrees, the extracted monitor signal and synchronization signal are in phase. Therefore, the error signal generated by multiplying the inverse of synchronization signal and the monitor signal is negative, which leads to decreasing the DC bias. This leads to the optimal zero cross condition, where the feedback converges to the point 811, therefore a stable angle of 90 degrees. It should be noted that 270 degrees leads to null monitor signal. However, due to the phase information, this point is unstable; therefore the feedback circuit only locks and tracks the phase of 90 degrees. Moreover, the method according to the present embodiment enables to discriminate between 90 degree and −90 degree (=270 degree) of the phase differences between the I signal and the Q signal.

Here, in the present invention, each of the initial sign of the extracted monitor signal and the synchronization signal when multiplying them may be chosen according to the configuration of the ABC circuits or of simulation so that the bias control is converged.

The curve 813 represents the conditions corresponding to FIG. 9, for 16QAM. The error signal is similar to the one of curve 812, therefore the ABC circuit 330 enables to track and lock to the optimal angle conditions. The curve 814 represents the conditions corresponding to FIG. 10, for 256QAM. The error signal is similar to the one of curve 812, therefore the ABC circuit 330 enables to track and lock to the optimal bias conditions. The curve 815 represents the conditions corresponding to FIG. 11, for digital frequency offset. The error signal is similar to the one of curve 812, therefore the ABC circuit enables to track and lock to the optimal bias conditions.

Moreover, the ABC circuit according to the present exemplary embodiment is able to discriminate between 90 degrees and −90 degrees of the phase differences, therefore the applied frequency offset has the correct sign and the received signal is optimal.

Figure 15:
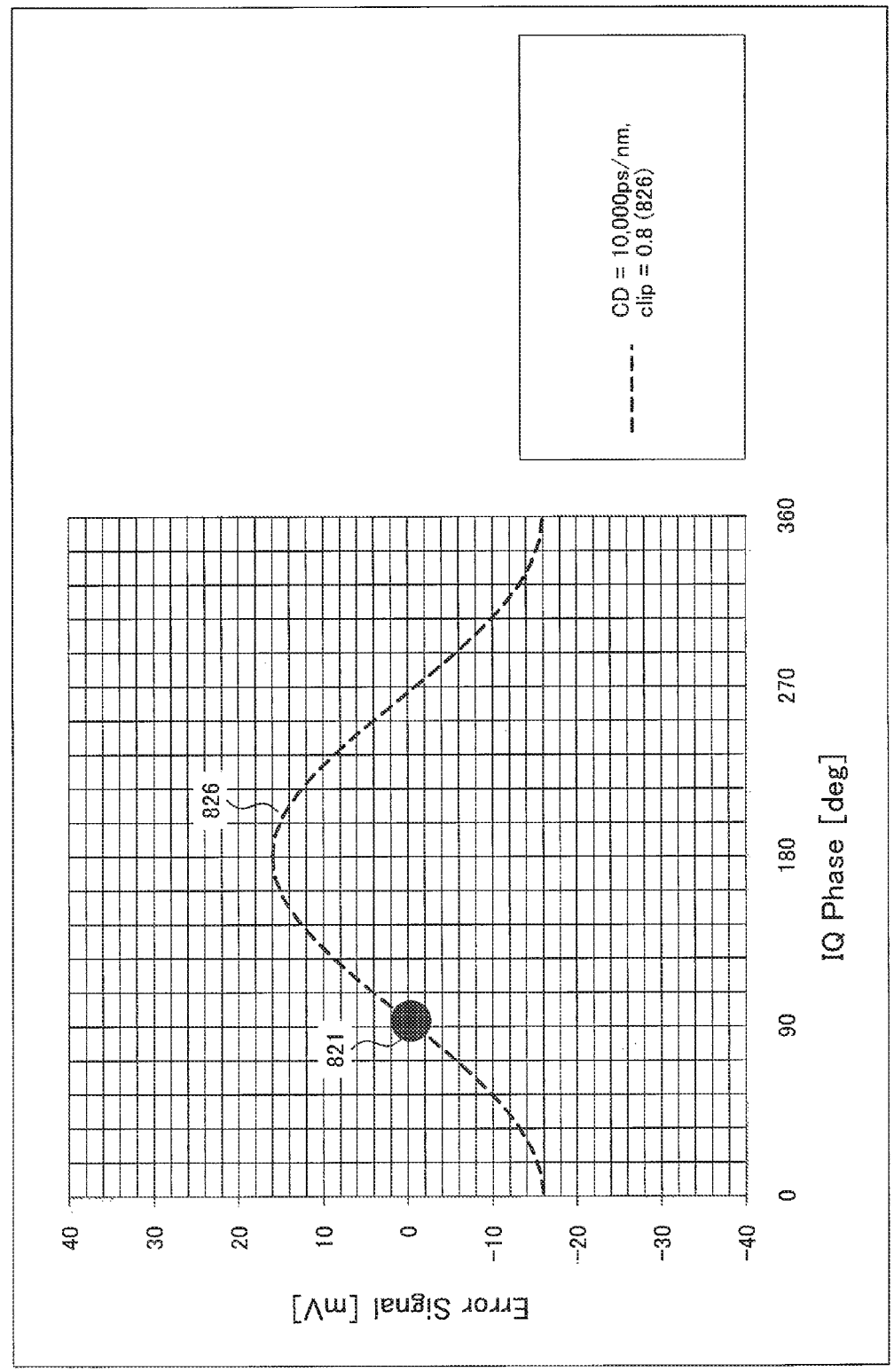
FIG. 15 A summary of simulation results of the control of the angle of quadrature of the IQ modulator for the configurations of FIG. 12.

FIG. 15 is a summary of simulation results of the control of the angle of quadrature of the IQ modulator for the configurations of FIG. 12. FIG. 15 shows the simulation result of the error signal provided to the phase control unit 333 of the ABC circuit 330 for the conditions corresponding to FIG. 12, i.e. with pre-compensation of 10,000 ps/nm of CD. The point 821 is identical to the point 811 of FIG. 14. The error signal of curve 826 is similar to the one of curve 812, therefore the ABC circuit enables to track and lock to the optimal angle of quadrature conditions. Identically, according to the exemplary embodiment, the angle of quadrature is locked on 90 degrees and the angle of −90 degrees is not stable. This ensures that the applied pre-distortion is for 10,000 ps/nm as an angle of −90 degrees would cause a pre-distortion of the opposite amount of CD.

It is now apparent that the present exemplary embodiment does not require additional cost size or resource to the transmitter equipped with a DSP. The present exemplary embodiment enables the IQ modulator of the digital transmitter to control with reliable correctness and high precision at startup and during operation for various modulation formats and various conditions of pre-distortion applied to the transmitter. Therefore the present exemplary embodiment enables the transmission and reception of high quality signal by a digital transmitter on wide and re-configurable conditions of modulation format and signal processing at the transmitter. The present exemplary embodiment enables to control the angle of quadrature of the IQ modulator with a correct sign; therefore the present exemplary embodiment enables transmission of signal processed with correct parameters in pre-compensation processing.

Further, the following minimum structure takes the same effect of the first exemplary embodiment. Namely, the minimum structure of the transmitter 300 (digital processing apparatus) includes the transmitter DSP 320 (digital processing unit), DP-IQ modulator 311 (optical modulating means), monitor PD (detecting means), filters 334 to 336 (filter means) and control units 331 to 333 (control means). The transmitter DSP 320 compares the value of digital data of symbol rate F (F is an integer greater than one) to at least one predetermined threshold value, selects an offset value that has a periodicity of N/F (N is an integer greater than one) based on the result of the comparison, adds the selected offset value to the digital data and converts the digital data added the offset value to analog signals in each lanes.

The DP-IQ modulator modulates a lightwave according to the digital data added the offset value with predetermined modulation format at the symbol rate F. The monitor PD generates a monitor signal from the modulated lightwave.

The filters 334 to 336 extract a frequency component at a frequency equal to the frequency F/N or a harmonic frequency of F/N from the monitor signal.

The control units 331 to 333 control a bias voltage for the DP-IQ modulator according to the monitor signal.

(Second Exemplary Embodiment)

Figure 16:
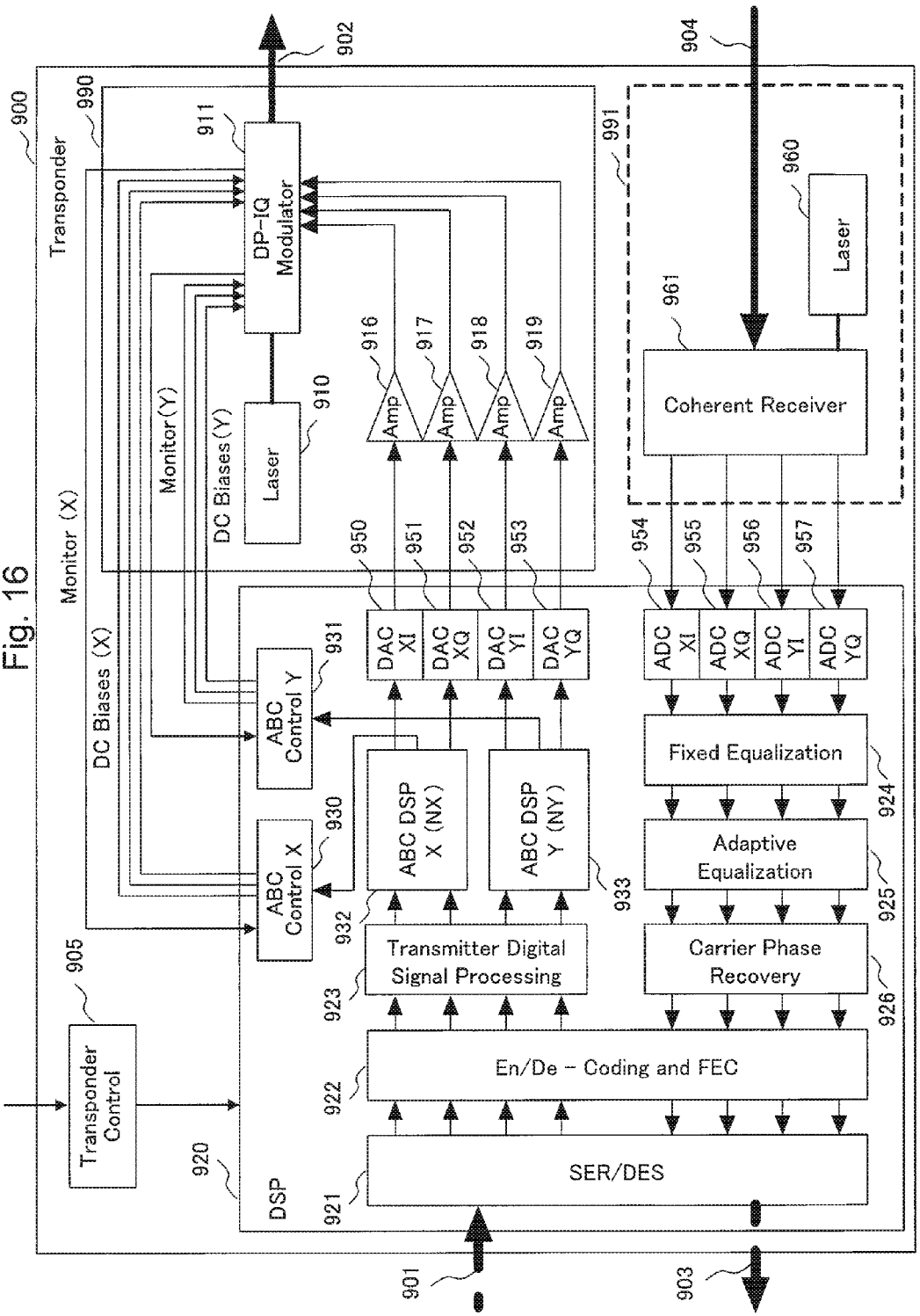
FIG. 16 A schematic representation of an optical transponder according to the second exemplary embodiment.

FIG. 16 is a schematic representation of an optical transponder 900, according to the second exemplary embodiment of the present invention. The transponder 900 includes a transmitter 990 generating a lightwave signal 902 modulated according to the data stream 901. The data stream 901 represents a logical stream and may include several lower bit rate parallel tributaries.

The transponder 900 also includes a receiver 991, which receives an optical signal 904 to be received and demodulated into the data stream 903. The data stream 903 represents a logical stream and may include several lower bit rate parallel tributaries.

The transponder 900 includes a transponder control unit 905 which control functions of the transponder according to a control signal provided remotely.

The transmitter 990 includes a DP-IQ modulator 911, identical to the DP-IQ modulator 311 which modulates light carrier emitted by the laser 910.

The DP-IQ modulator 911 modulates lightwave according to the four high speed input voltages amplified by the four driver amplifiers 916, 917, 918 and 919 which are identical to the driver amplifiers 316, 317, 318 and 319.

The receiver 991 includes a laser 960 used as a local oscillator. The light emitted from the laser 960 is mixed with the received signal 904 by the coherent receiver 961. The coherent receiver 961 is an integrated coherent front end, which includes a polarization diversity type coherent mixer, four balanced photo-detectors which detect the four output of the coherent mixer and linear amplifiers which amplify the output of the balanced detectors.

The DSP 920 is used by the transmitter 990 and by the receiver 991.

The functions and configurations of processing units of the DSP 920 can be set and re-configured through the transponder control unit 905.

The DSP 920 generates four high speed analog signals with the DAC 950, 951, 952 and 953, according to the data stream 901. The signals output by the DACs are respectively amplified by the driver amplifiers 916, 917, 918 and 919.

On the receiver side, the four output of the receiver 961 are digitalized by the Analog to Digital Converters (ADC) 954, 955, 956 and 957. After processing of the ADCs, the resulting data is output by the transponder 900 as the binary data stream 903.

The DSP 920 comprises a serializer/deserializer (SER/DES) unit 921 which operates serialization and de-serialization on the data streams 901 and 903. The encoding/ decoding (En/De-Coding) and FEC unit 922 encodes the output of the unit 921 according to the chosen modulation format and generates frames for FEC. Additionally, the encoding/decoding and FEC unit 922 performs decision and decodes the demodulated data according to the modulation format and corrects errors according to FEC frames; the output of this operation is fed to the input of the SER/DES unit 921.

The transmitter digital signal processing unit 923 performs digital signal processing on the data, which will be used by the transmitter 990. For instance, the transmitter digital signal processing unit 923 can perform functions identical to the digital DSP units 430, 431, 432 and 433 of FIG. 2.

On the receiver side, the signal processing flow is realized with the fixed equalization unit 924, which performs fixed equalization on the signal digitalized by the ADC 954, 955, 956 and 957. Consecutively, adaptive equalization unit 925 performs tracking on the signal for further equalization and polarization de-multiplexing and tracking. The carrier phase recovery unit 926 compensates the frequency and phase difference between the light of the local oscillator 960 and the received signal 904. The output of the carrier phase recovery unit 926 is fed to the encoding/decoding and FEC unit 922.

The digital ABC units 932 and 933 (ABC DSP X (NX) and Y (NY) perform signal processing according to the digital ABC units 440 to 443 of the first exemplary embodiment. The digital ABC unit 932 includes DSP units similar to the digital ABC units 440 and 441 of FIG. 4, for the XI and XQ tributaries, characterized by the same integer NX. The digital DSP unit 932 also includes synchronization functions such as the synchronization unit 411 relative to the X polarization signals.

The digital ABC unit 933 includes digital ABC units similar to the units 442 and 443, for the YI and YQ tributaries, characterized by the same integer NY. The unit 933 also includes synchronization functions such as the synchronization unit 411 relative to the Y polarization signals.

The DSP 920 also comprises the respective ABC control units 930 and 931 for the control of the DC biases of the respective polarization X and Y. The units are similar to the units 330 and 340 of FIG. 3.

The synchronization information for the ABC circuits 930 and 931 is respectively given by the digital ABC units 932 and 933 internally to the DSP 920. The ABC circuits 930 and 931 respectively uses the monitor signals for the respective X and Y polarization from the DP-IQ modulator 911 and the ABC circuits 930 and 931 control the DC biases for the respective X and Y polarizations of the DP-IQ modulator 911. The outputs of the digital ABC unit 932 are fed to the DAC 950 and 951. The outputs of the digital ABC unit 933 are fed to the DAC 952 and 953.

The transponder 900 can emit and receive lightwave signals according to modulation formats set or re-configured by external signals, such as QPSK, QAM or Orthogonal FDM. The transponder 900 can emit lightwave signal with pre-distortion characteristics set by external signals. The DC biases of the DP-IQ modulator 911 are optimally and correctly set by the DSP 920 according to the present exemplary embodiment, for various conditions on modulation format and signal pre-compensation.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100 Transmitter
111 Modulator
112 I child Mach-Zehnder Modulator
113 Q child Mach-Zehnder Modulator
114 Phase adjustor
115 Monitor photo diode
121 Coding unit
122 DSP/DAC unit
300 Transmitter
101, 301 Input data stream
102, 302 Lightwave signal
111 IQ modulator
305 User control unit
310 Laser
311 DP-IQ modulator
130, 330, 340 ABC circuit
331 I bias control unit
332 Q bias control unit
333 Phase control unit
334 Filter I
335 Filter Q
336 Filter ϕIQ
116-117, 316-319 Driver amplifier
320 Transmitter DSP (TX DSP)
410 Control unit
411 Synchronization unit
120, 420 Serializer/desirializer (SER/DES) unit
421 Coding and FEC unit
430 Digital RZ carving unit
431 Linear pre-distortion unit
432 Nonlinear pre-distortion unit
433 TX Imperfections pre-distortion unit
440-443 digital ABC unit
450-453 Digital to analog converter (DAC)
501 Data(i)
502 Thresholds A(0) to A(h)
503 Offsets O(0) to O(h+1)
504 Polarity P(0) to P(h+1)
601-605, 621-625, 641-645 State of the digital ABC units
610-613, 630-632, 650, 651 Time interval
900 Transponder
901, 903 Data stream
902 Lightwave signal
904 Optical signal
905 Transponder control unit
911 DP-IQ modulator
916-919 Driver amplifier
920 DSP
921 Serializer/deserializer (SER/DES) unit
922 Encoding/decoding (En/De-Coding) and FEC unit
923 Transmitter digital signal processing unit
924 Fixed equalization unit
925 Adaptive equalization unit
926 Carrier phase recovery unit
930, 931 ABC circuit
932, 933 digital ABC unit
951-953 DAC
954-957 Analog to Digital Converters (ADC)
960 Laser 961 Coherent receiver
990 Transmitter
991 Receiver

What is claimed is:

1. A signal generating apparatus, comprising:
a digital processing unit that
   deserializes an input digital data into parallel data lanes;
   compares the value of the digital data of symbol rate F, where F is a real number, to at least one predetermined threshold value;
   selects an offset value based on the result of the comparison; and
   adds the selected offset value to the digital data,
a converting unit that converts the digital data added the offset value to analog signals in each data lane; and
an optical modulating unit that modulates a lightwave according to the analog signals with predetermined modulation format at the symbol rate F, where the modulated signal contains a frequency component at F/N and N is an integer strictly greater than 1, wherein
the offset value is selected among a set of selectable offset values,
which are updated with a temporal periodicity of N/F.

2. The signal generating apparatus according to claim 1, further comprising:
a detecting unit that generates a monitor signal from the modulated lightwave;
a filter unit that extracts a frequency component at a frequency equal to the frequency F/N or to a harmonic frequency of F/N from the monitor signal; and
a control unit that controls a bias voltage for the optical modulating unit according to the amplitude and the phase of the frequency component extracted from the monitor signal.

3. The signal generating apparatus according to claim 1, wherein:
each of the threshold value is an M bit value, where M is an integer;
each of the offset value is an L bit value, where L is an integer;
each of the digital data is coded on a number of bits equal or greater than L+M;
the comparisons between the digital data and the threshold values are performed by comparing the M most significant bits of the data to the threshold values; and
the step of adding offset values is performed by adding offset values to the L least significant bits of the digital data.

4. The signal generating apparatus according to claim 1, wherein:
the number of the threshold values is equal to two;
a first sign is a sign of the offset value added to the digital data in case that the digital data is greater than or equal to first value of the threshold value and less than second value of the threshold value;
the second sign is a sign of the offset value in case that the digital data is greater than both of the first threshold value and the second threshold value, or, in case that the digital data is smaller than both of the first threshold value and the second threshold value; and
the first sign is different from the second sign.

5. The signal generating apparatus according to claim 2, wherein:
the number N is equal for all the data lanes of digital data;
the optical modulating unit comprises child Inphase Mach Zehnder Modulator and a child Quadrature Phase Mach Zehnder Modulator; and
the control unit controls a first bias that is the DC bias of the child Inphase Mach Zehnder Modulator, a second bias that is the DC bias of the child Quadrature Phase Mach Zehnder Modulator and a third bias that is the bias of the angle of quadrature of the optical modulating unit.

6. The signal generating apparatus according to claim 2, wherein
the number N of the data converted to analog signal used for the child Inphase Mach Zehnder modulator of the optical modulating unit is N(I), and the number N of the data converted to analog signal used for the child Quadrature Phase Mach Zehnder modulator of the optical modulating unit is N(Q), so that N(I) is distinct from N(Q);
the bias voltage for controlling the child Inphase Mach Zehnder Modulator of the optical modulating unit is controlled according to the extracted frequency equal to F/N(I) or a harmonic frequency of F/N(I);
the bias voltage for controlling the child Quadrature Phase Mach Zehnder Modulator of the optical modulating unit is controlled according to the extracted frequency equal to F/N(Q) or a harmonic frequency of F/N(Q); and
the bias voltage for controlling the angle of quadrature of the optical modulating unit is controlled according to the filtered frequency equal to a common harmonic of the frequencies F/N(I) and F/N(Q).

7. The signal generating apparatus according to claim 1 wherein
the predetermined modulation format is reconfigurable.

8. The signal generating apparatus according to claim 1, wherein
the digital processing unit performs equalization of the input data and the equalization is settable and reconfigurable.

9. The signal generating apparatus according to claim 8, wherein
the equalization includes at least one of digital RZ (return to zero) carving function, linear pre-distortion function, nonlinear pre-distortion function and imperfections pre-distortion function.

10. A signal generating method, comprising:
deserializing an input digital data into parallel data lanes;
comparing the value of the digital data of symbol rate F, where F is a real number, to at least one predetermined threshold value;
selecting an offset value based on the result of the comparison;
adding the selected offset value to the digital data;
converting the digital data added the offset value to analog signals in each lanes; and
modulating a lightwave according to the analog signals with predetermined modulation format at the symbol rate F, where the modulated signal contains a frequency component at F/N and N is an integer strictly greater than 1, wherein
the offset value is selected among a set of selectable offset values, which are updated with a temporal periodicity of N/F.

11. The signal generating apparatus according to claim 2, wherein:
each of the threshold value is an M bit value, where M is an integer;

each of the offset value is an L bit value, where L is an integer;

each of the digital data is coded on a number of bits equal or greater than L+M;

the comparisons between the digital data and the threshold values are performed by comparing the M most significant bits of the data to the threshold values; and the step of adding offset values is performed by adding offset values to the L least significant bits of the digital data.

12. The signal generating apparatus according to claim 2, wherein:

the number of the threshold values is equal to two;

a first sign is a sign of the offset value added to the digital data in case that the digital data is greater than or equal to first value of the threshold value and less than second value of the threshold value;

the second sign is a sign of the offset value in case that the digital data is greater than both of the first threshold value and the second threshold value, or, in case that the digital data is smaller than both of the first threshold value and the second threshold value; and the first sign is different from the second sign.

13. The signal generating apparatus according to claim 3, wherein:

the number of the threshold values is equal to two;

a first sign is a sign of the offset value added to the digital data in case that the digital data is greater than or equal to first value of the threshold value and less than second value of the threshold value;

the second sign is a sign of the offset value in case that the digital data is greater than both of the first threshold value and the second threshold value, or, in case that the digital data is smaller than both of the first threshold value and the second threshold value; and the first sign is different from the second sign.

14. The signal generating apparatus according to claim 3, wherein:

the number N is equal for all the data lanes of digital data;

the optical modulating unit comprises child Inphase Mach Zehnder Modulator and a child Quadrature Phase Mach Zehnder Modulator; and the control unit controls a first bias that is the DC bias of the child Inphase Mach Zehnder Modulator, a second bias that is the DC bias of the child Quadrature Phase Mach Zehnder Modulator and a third bias that is the bias of the angle of quadrature of the optical modulating unit.

15. The signal generating apparatus according to claim 3, wherein the number N of the data converted to analog signal used for the child Inphase Mach Zehnder modulator of the optical modulating unit is N(I), and the number N of the data converted to analog signal used for the child Quadrature Phase Mach Zehnder modulator of the optical modulating unit is N(Q), so that N(I) is distinct from N(Q);

the bias voltage for controlling the child Inphase Mach Zehnder Modulator of the optical modulating unit is controlled according to the extracted frequency equal to F/N(I) or a harmonic frequency of F/N(I);

the bias voltage for controlling the child Quadrature Phase Mach Zehnder Modulator of the optical modulating unit is controlled according to the extracted frequency equal to F/N(Q) or a harmonic frequency of F/N(Q); and the bias voltage for controlling the angle of quadrature of the optical modulating unit is controlled according to the filtered frequency equal to a common harmonic of the frequencies F/N(I) and F/N(Q).

16. The signal generating apparatus according to claim 4, wherein:

the number N is equal for all the data lanes of digital data;

the optical modulating unit comprises child Inphase Mach Zehnder Modulator and a child Quadrature Phase Mach Zehnder Modulator; and the control unit controls a first bias that is the DC bias of the child Inphase Mach Zehnder Modulator, a second bias that is the DC bias of the child Quadrature Phase Mach Zehnder Modulator and a third bias that is the bias of the angle of quadrature of the optical modulating unit.

17. The signal generating apparatus according to claim 4, wherein the number N of the data converted to analog signal used for the child Inphase Mach Zehnder modulator of the optical modulating unit is N(I), and the number N of the data converted to analog signal used for the child Quadrature Phase Mach Zehnder modulator of the optical modulating unit is N(Q), so that N(I) is distinct from N(Q);

the bias voltage for controlling the child Inphase Mach Zehnder Modulator of the optical modulating unit is controlled according to the extracted frequency equal to F/N(I) or a harmonic frequency of F/N(I);

the bias voltage for controlling the child Quadrature Phase Mach Zehnder Modulator of the optical modulating unit is controlled according to the extracted frequency equal to F/N(Q) or a harmonic frequency of F/N(Q); and the bias voltage for controlling the angle of quadrature of the optical modulating unit is controlled according to the filtered frequency equal to a common harmonic of the frequencies F/N(I) and F/N(Q).

18. The signal generating apparatus according to claim 11, wherein:

the number N is equal for all the data lanes of digital data;

the optical modulating unit comprises child Inphase Mach Zehnder Modulator and a child Quadrature Phase Mach Zehnder Modulator; and the control unit controls a first bias that is the DC bias of the child Inphase Mach Zehnder Modulator, a second bias that is the DC bias of the child Quadrature Phase Mach Zehnder Modulator and a third bias that is the bias of the angle of quadrature of the optical modulating unit.

19. The signal generating apparatus according to claim 11, wherein the number N of the data converted to analog signal used for the child Inphase Mach Zehnder modulator of the optical modulating unit is N(I), and the number N of the data converted to analog signal used for the child Quadrature Phase Mach Zehnder modulator of the optical modulating unit is N(Q), so that N(I) is distinct from N(Q);

the bias voltage for controlling the child Inphase Mach Zehnder Modulator of the optical modulating unit is controlled according to the extracted frequency equal to F/N(I) or a harmonic frequency of F/N(I);

the bias voltage for controlling the child Quadrature Phase Mach Zehnder Modulator of the optical modulating unit is controlled according to the extracted frequency equal to F/N(Q) or a harmonic frequency of F/N(Q); and the bias voltage for controlling the angle of quadrature of the optical modulating unit is controlled according to the filtered frequency equal to a common harmonic of the frequencies F/N(I) and F/N(Q).

20. A signal generating apparatus, comprising:

digital processing means for
- deserializing an input digital data into parallel data lanes;
- comparing the value of the digital data of symbol rate F, where F is a real number, to at least one predetermined threshold value;
- selecting an offset value based on the result of the comparison; and
- adding the selected offset value to the digital data, converting means for converting the digital data added the offset value to analog signals in each data lane; and optical modulating means for modulating a lightwave according to the analog signals with predetermined modulation format at the symbol rate F, where the modulated signal contains a frequency component at F/N and N is an integer strictly greater than 1, wherein the offset value is selected among a set of selectable offset values, which are updated with a temporal periodicity of N/F.

* * * * *